(12) United States Patent
Saito et al.

(10) Patent No.: US 8,798,153 B2
(45) Date of Patent: Aug. 5, 2014

(54) VIDEO DECODING METHOD

(75) Inventors: Shohei Saito, Matsudo (JP); Masashi Takahashi, Palo Alto, CA (US); Muneaki Yamaguchi, Inagi (JP); Hiroaki Ito, Kawasaki (JP); Koichi Hamada, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 607 days.

(21) Appl. No.: 12/620,640

(22) Filed: Nov. 18, 2009

(65) Prior Publication Data

US 2010/0128792 A1    May 27, 2010

(30) Foreign Application Priority Data

Nov. 26, 2008  (JP) ................. 2008-300342
Apr. 2, 2009   (JP) ................. 2009-089678

(51) Int. Cl.
*H04N 7/12* (2006.01)

(52) U.S. Cl.
USPC ............................................. 375/240.16

(58) Field of Classification Search
USPC ............................. 375/240.01, 240.16
IPC ..................................... H04N 7/12
See application file for complete search history.

(56) References Cited

U.S. PATENT DOCUMENTS

| | | | | |
|---|---|---|---|---|
| 7,242,716 B2* | 7/2007 | Koto et al. | ............... | 375/240.16 |
| 2004/0008784 A1 | 1/2004 | Kikuchi et al. | | |
| 2007/0127572 A1* | 6/2007 | Sasai et al. | ............... | 375/240.16 |
| 2008/0123743 A1 | 5/2008 | Douniwa et al. | | |
| 2008/0285656 A1* | 11/2008 | Au et al. | ............... | 375/240.22 |
| 2009/0051819 A1* | 2/2009 | Hasegawa | ............... | 348/699 |

FOREIGN PATENT DOCUMENTS

| | | |
|---|---|---|
| CN | 101193201 A | 6/2008 |
| JP | 2003-333540 A | 11/2003 |
| JP | 2004-23458 A | 1/2004 |
| JP | 2007-82030 A | 3/2007 |
| JP | 2008-277932 A | 11/2008 |
| JP | 2009-532990 A | 9/2009 |
| WO | 01/47277 A1 | 6/2001 |
| WO | 03/007119 A2 | 1/2003 |
| WO | 03/079681 A1 | 9/2003 |
| WO | 2006/106039 A1 | 10/2006 |
| WO | 2007/115126 A1 | 10/2007 |

OTHER PUBLICATIONS

J. Jung et al.; RD-Optimized Competition Scheme for Efficient Motion Prediction; Visual Communications and Image Processing 2007; SPIE-IS&T/vol. 6508; pp. 1-11.

(Continued)

*Primary Examiner* — Dave Czekaj
*Assistant Examiner* — Tracy Li
(74) *Attorney, Agent, or Firm* — Mattingly & Malur, PC

(57) ABSTRACT

A method of decoding videos comprises the steps of performing, in respect of a decoding objective area of decoding objective frame, a motion search by using images of plural frames finished with decoding and deciding, on the basis of the result of the motion search, whether an image of the decoding objective area is to be generated through an interpolation process or a decoded image is to be generated through motion compensation using data included in an encoding stream.

20 Claims, 26 Drawing Sheets

(56) References Cited

OTHER PUBLICATIONS

S. Kamp et al.; Decoder Side Motion Vector Derivation with Multiple Reference Pictures; ITU-Telecommunications Standardization Sector; 34th Meeting Antalya, Turkey, Jan. 12-13, 2008; Document VCEG-AH15r1; pp. 1-14.

Detlev Marpe et al.; The H.264/MEPG4 Advanced Video Coding Standard and its Applications; IEEE Communications Magazine; Aug. 2006; pp. 134-143.

S. Kamp et al.; Multi-Hypothesis Prediction with Decoder Side Motion Vector Derivation (DMVD), 27. JVT Meeting; Jun. 4, 2008- Oct. 4, 2008; Geneva,; (Joint Video Team of ISO/IEC JTC1/SC29WG11 and ITU-T SG.16); Apr. 24, 2008; XP030007383.

"8.4.1.2.3 Derivation process for temporal direct luma motion vector and reference index prediction mode", ITU-T Rec. H.264, Mar. 2005, pp. 144-147.

Kamp et al., "Decoder Side Motion Vector Derivation," MPEG 2007 Meeting, Oct. 2007, 24 pp., Shenzhen, China.

Kamp et al., "Improving AVC compression performance by template matching with decoder-side motion vector derivafion," MPEG 2008 Meeting, Apr. 2008, 12 pp., Archamps, France.

* cited by examiner

PRIOR ART
FIG.8A
PRIOR ART
FIG.8B
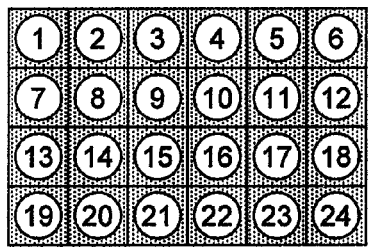
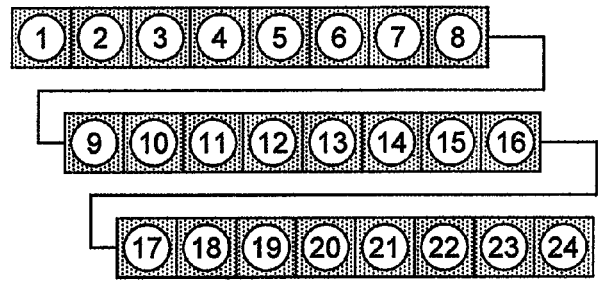
FIG.8C
FIG.8D
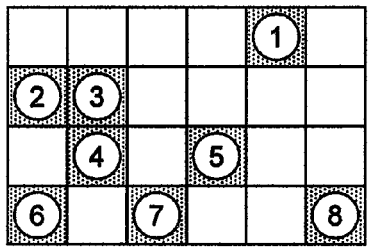
 ENCODING OBJECTIVE IMAGE AREA
 INTERPOLATION IMAGE AREA

PRIOR ART
FIG.9A

▓ ENCODING OBJECTIVE IMAGE AREA

☐ INTERPOLATION IMAGE AREA

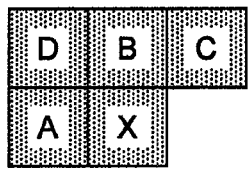

PREDICTIVE MOTION VECTOR PMV
$= \text{Median}(MV_A, MV_B, MV_C)$ $MV_A, MV_B, MV_C$:
MOTION VECTOR USED FOR ENCODING PROCESS IN EACH ENCODING OBJECTIVE IMAGE AREA

FIG.9B

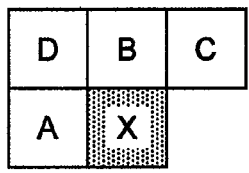

PREDICTIVE MOTION VECTOR PMV
$= \text{Median}(MVC_A, MVC_B, MVC_C)$ $MVC_A, MVC_B, MVC_C$:
MOTION VECTOR USED FOR GENERATION OF INTERPOLATION IMAGE IN EACH INTERPOLATION IMAGE AREA

FIG.9C

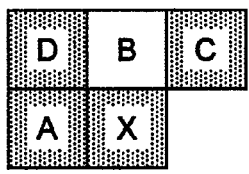

PREDICTIVE MOTION VECTOR PMV
$= \text{Median}(MV_A, MVC_B, MV_C)$

PREDICTIVE MOTION VECTOR PMV
$= \text{Median}(MV_A, MV_C, MV_D)$

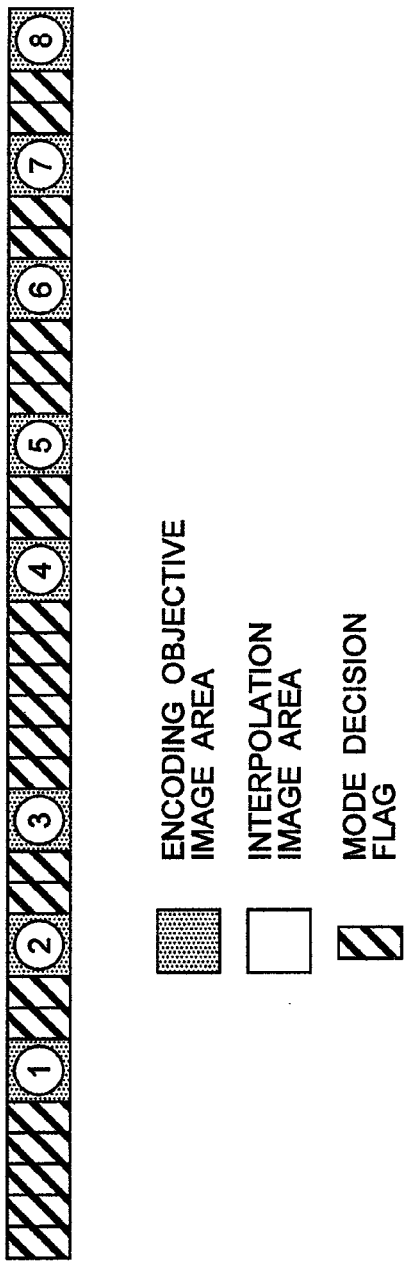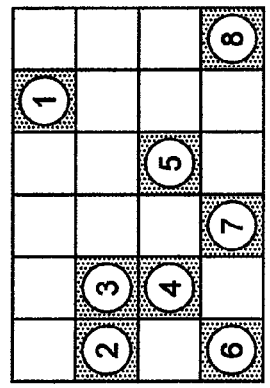

FIG.17
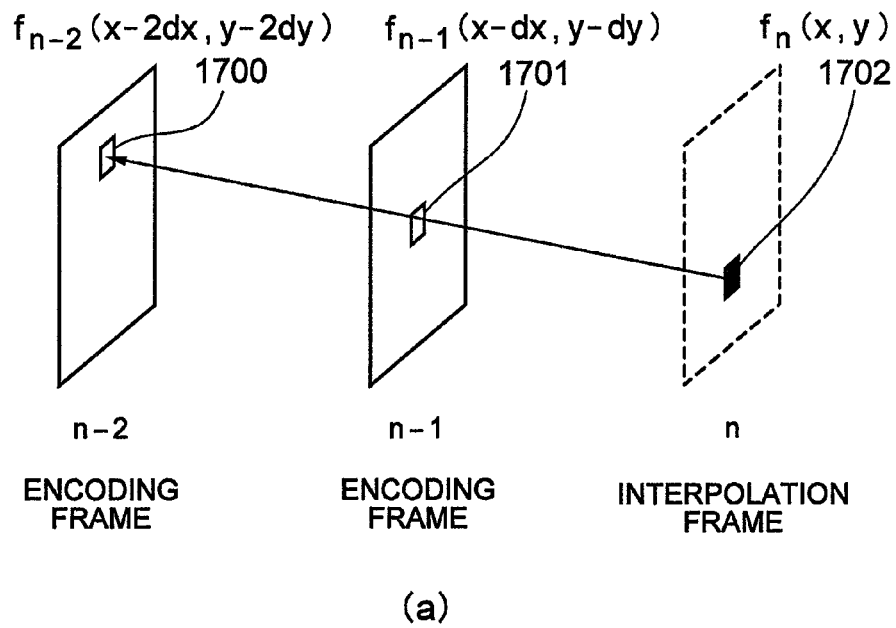
(a)
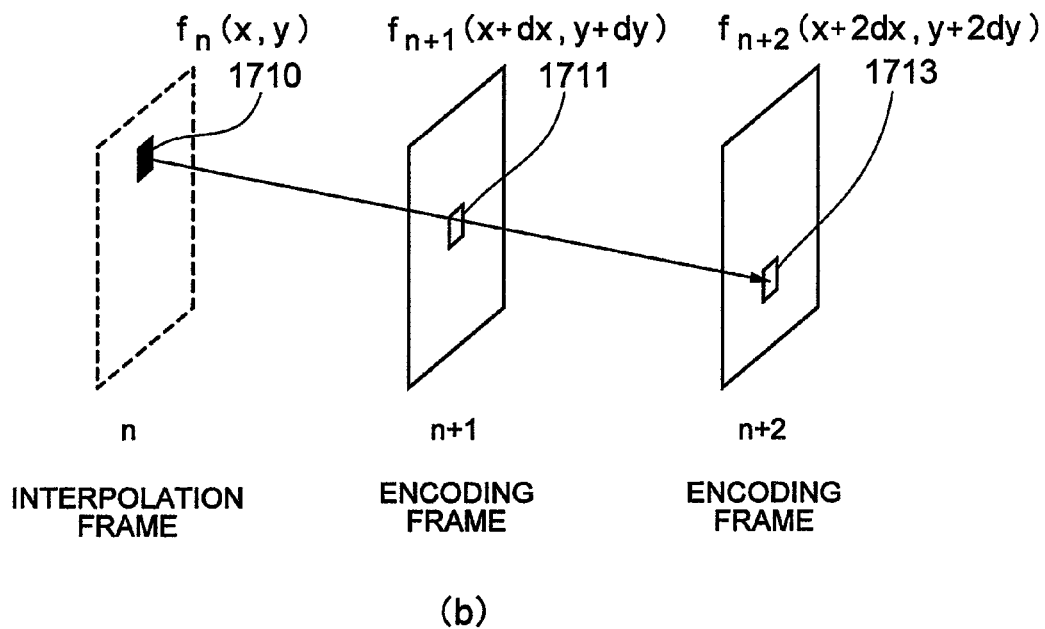
(b)

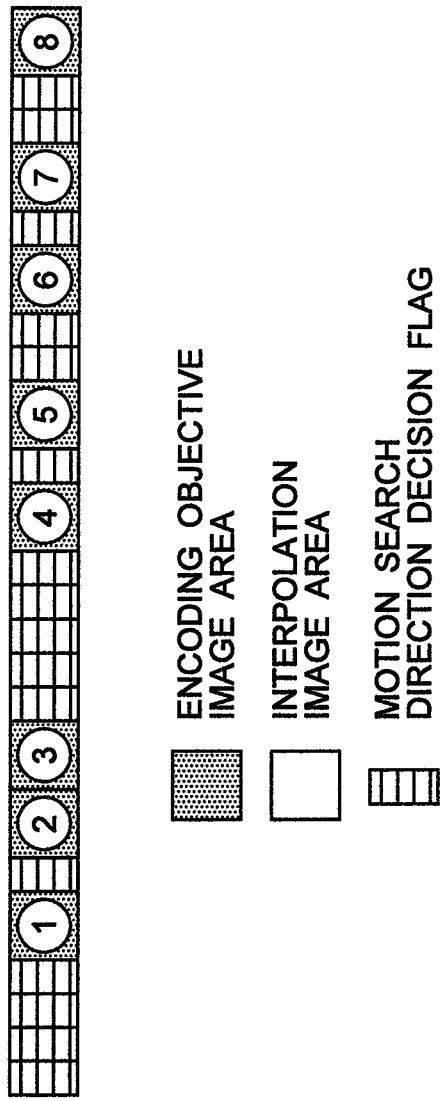
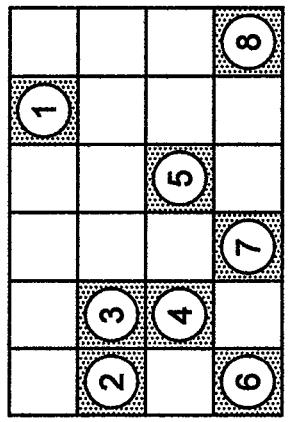

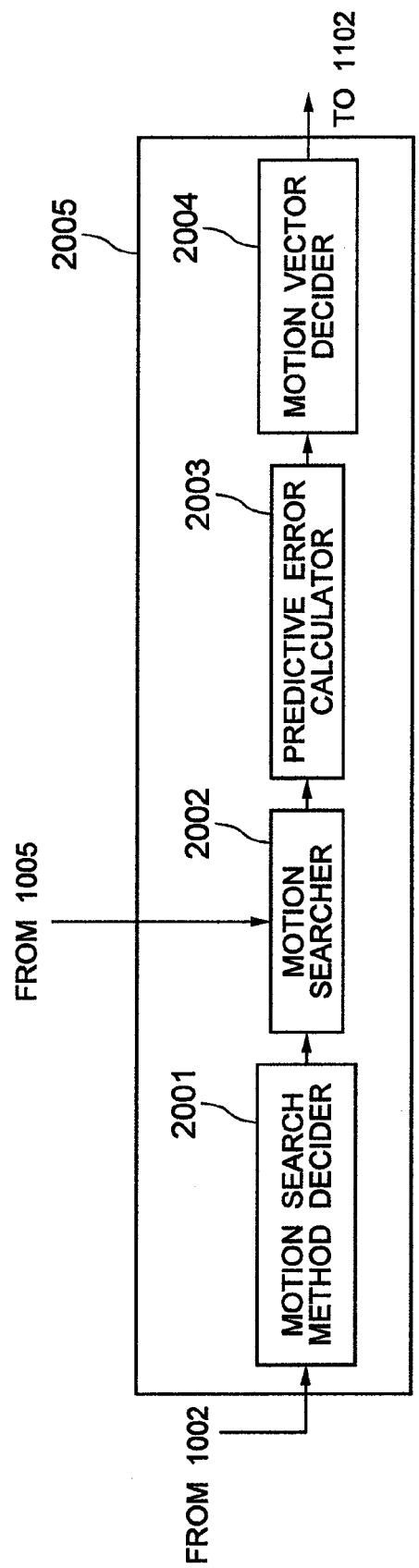

VIDEO DECODING METHOD

CROSS-REFERENCE TO RELATED APPLICATION

The present invention is related to U.S. patent application Ser. No. 11/672,610 entitled "Image display apparatus" filed on Feb. 8, 2007. The disclosure of the above U.S. application is herein incorporated by reference.

INCORPORATION BY REFERENCE

The present application claims priorities from Japanese applications JP2008-300342 filed on Nov. 26, 2008 and JP2009-089678 filed on Apr. 2, 2009, the contents of which are hereby incorporated by reference into this application.

BACKGROUND OF THE INVENTION

The present invention relates to techniques of encoding and decoding video data.

In connection with encoding and decoding techniques for compressing and transmitting video data, an internationally standardized encoding standard as typified by the MPEG (Moving Picture Experts Group) standard has hitherto been available. Among the internationally standardized encoding standards, the H.264/AVC (Advanced Video Encoding) standard, for example, especially has high encoding efficiencies and has been utilized widely as a standard for moving picture compression in ground digital broadcasting, digital video camera, next generation encoding media, cellular phones and so on. The data thus compressed pursuant to the standard as above is decoded in a television receiver, a DVD player and the like and the thus decoded video data is displayed on a display.

Then, JP-A-2003-333540 discloses the frame rate conversion to be carried out by using a motion amount (motion vector) obtained by decoding an encoding stream and the decoded image as well in order to eliminate a blur in moving picture and an unnatural motion which occur when displaying the decoded video data.

In the technique described in the aforementioned Patent Document, a frame rate conversion process is applied to the decoded video data. The frame rate conversion process, however, presupposes that a motion vector and a difference image are transmitted from the encoding side to the decoding side and fails to contribute to reduction in the amount of transmission data, raising a problem that improvements in data compression rate are insufficient.

SUMMARY OF THE INVENTION

The present invention has been made in the light of the above problem and its object is to improve the data compression rate.

To accomplish the above object, embodiments of the present invention can be constructed as recited in, for example, the attached claims.

Thus, according to the present invention, it is possible to improve the data compression rate.

Other objects, features and advantages of the invention will become apparent from the following description of the embodiments of the invention taken in conjunction with the accompanying drawings.

BRIEF DESCRIPTION OF THE DRAWINGS

FIGS. 8A, 8B, 8C and 8D show an example of data to be stored in an encoded data memory unit.

FIGS. 9A, 9B and 9C show examples of motion predictive vectors.

FIGS. 14A and 14B are diagrams showing an example of data to be stored in the encoded data memory unit in embodiment 2.

FIG. 17 is a diagram showing an example of a motion search method in a motion searcher in embodiment 3.

FIGS. 19A and 19B are diagrams showing an example of data to be stored in the encoded data memory unit in embodiment 3.

FIG. 20 is a block diagram showing the construction of a motion search unit in the video decoding apparatus in embodiment 3.

DETAILED DESCRIPTION OF THE EMBODIMENTS

Embodiments of the present invention will now be described with reference to the accompanying drawings.

Embodiment 1

Figure 1:
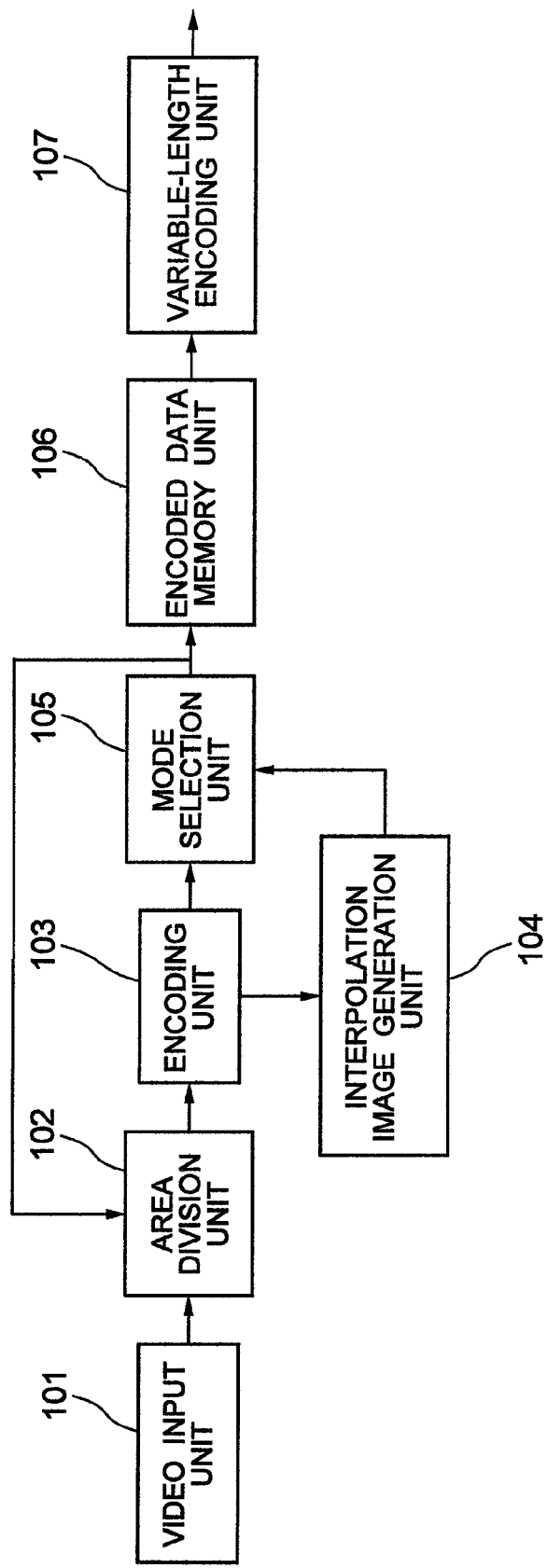
FIG. 1 is a schematic diagram showing the configuration of a video encoding apparatus according to embodiment 1 of the invention.

Referring first to FIG. 1, there is illustrated an example of a video encoding apparatus according to embodiment 1 of the invention. The video encoding apparatus according to embodiment 1 comprises, for example, a video input unit 101 for inputting videos, an area division unit 102 for dividing an input video into encoding objective areas, an encoding unit 103 for encoding input video data divided by the area division unit and locally decoding the data, an interpolation (the term "interpolation" being used generally to signify interpolation per se and extrapolation inclusive excepting the case where the two is used distinctively as will be described later) image generation unit 104 for thinning out images (encoded images) locally decoded by the encoding unit 103 in time direction and generating interpolation images adapted to interpolate the thinned out images, a mode selection unit 105 for selecting either an encoded image and an interpolated image, a encoded data memory unit 106 for recording encoded image data and flag data, and a variable-length encoding unit 107 for encoding data stored in the encoded data memory unit 106 in a variable-length fashion and outputting an encoding stream. Details of operation in the individual processing units of video encoding apparatus according to embodiment 1 will be described hereunder.

Firstly, the video input unit 101 rearranges input videos in order of their encoding. In the rearrangement of order, order of display is rearranged to order of encoding in accordance with the picture type. Next, in the area division unit 102, an encoding objective frame is divided into encoding objective areas. The size of divisional area may be in a unit of block such as a square or rectangular area or alternatively may be in a unit of object extracted by using a method of watershed process. Divided videos in the area division unit 102 are transmitted to the encoding unit 103.

Figure 2:
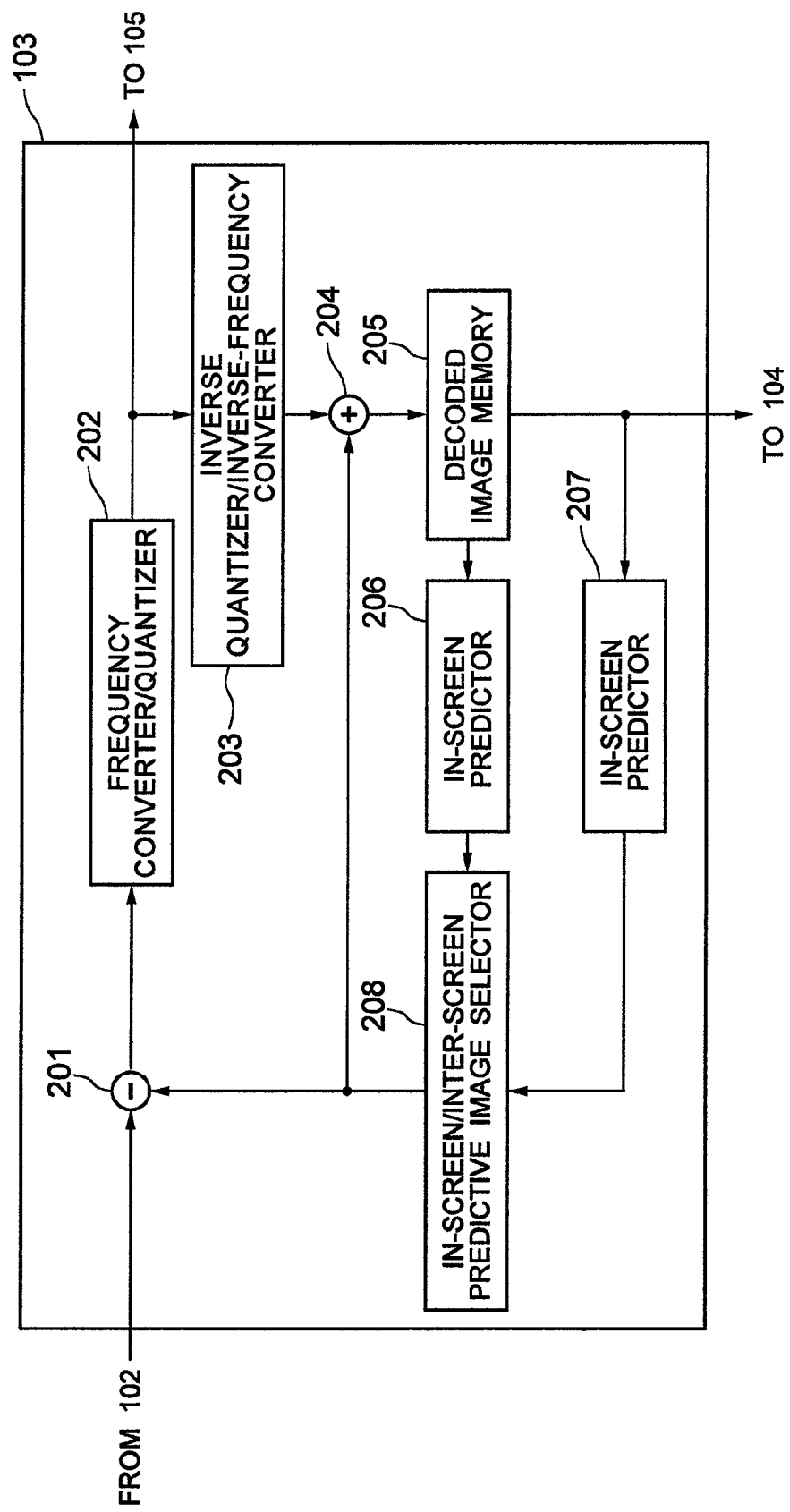
FIG. 2 is a block diagram showing the construction of an encoding unit in FIG. 1.

Then, the construction of encoding unit 103 is illustrated in detail in FIG. 2. The encoding unit 103 includes, for example, a subtracter 201 for calculating the difference between an image as a result of division by the area division unit 102 and a predictive image selected by an in-screen/inter-screen predictive image selector 208, a frequency converter/quantizer 202 for frequency-converting and quantizing the difference data generated by the subtracter 201, an inverse quantizer/inverse-frequency converter 203 for inverse quantizing and inverse-frequency converting data outputted from the frequency converter/quantizer 202, an adder 204 for adding the data decoded by the inverse quantizer/inverse-frequency converter 203 to the predictive image selected by the in-screen/inter-screen predictive image selector 208, a decoded image memory 205 for storing the sum image from the adder 204, an in-screen predictor 206 for generating a predictive image on the basis of pixels peripheral of the encoding objective area, an inter-screen predictor 207 for detecting an image (reference image) close to the encoding objective area from an area belonging to a frame different from the encoding objective area so that the detected image may be generated as a predictive image, and the in-screen/inter-screen predictive image selector 208 for selecting one of the in-screen predictive and inter-screen predictive images which has a higher encoding efficiency.

Details of operation in the individual processors in encoding unit 103 will now be described. In the frequency converter/quantizer 202, the difference image is frequency-converted by using a DCT (Discrete Cosine transform) and a wavelet conversion and then, a coefficient after the frequency conversion is quantized. Data after quantization is transmitted to the mode selection unit 105 and the inverse quantizer/inverse-frequency converter 203. In the inverse quantizer/inverse-frequency converter 203, a process inverse to that carried out in the frequency converter/quantizer 202 is conducted. Next, the adder 204 adds a predictive image selected by the in-screen/inter-screen predictive image selector 208 to a difference image generated through the inverse quantization/inverse-frequency conversion by means of the inverse quantizer/inverse-frequency converter 203, generating a decoded image. The thus generated decoded image is stored in the decoded image memory 205. In the inter-screen predictor 206, a predictive image is generated by using pixels of peripheral areas finished with decoding which have been stored in the decoded image memory 205. Further, in the inter-screen predictor 207, a predictive image is generated through a process for matching between data inside the frame finished with decoding which has been stored in the decoded image memory 205 and the input image. The decoded image memory 205 then transmits the decoded image to the interpolation image generation unit 104.

Figure 3:
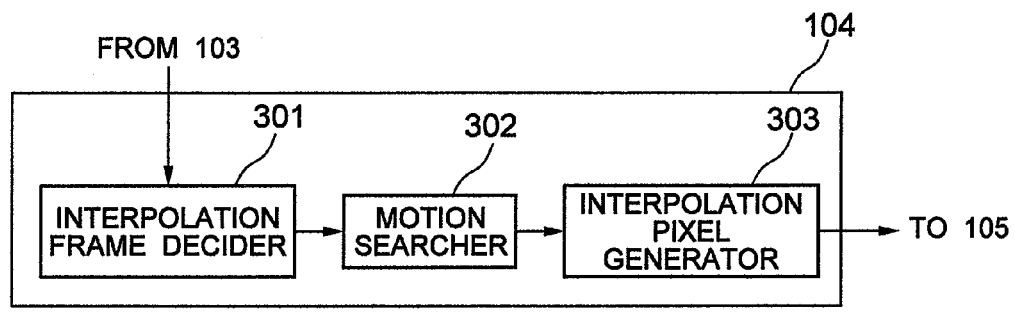
FIG. 3 is a block diagram showing the construction of an interpolation image generation unit in FIG. 1.

Turning now to FIG. 3, details of construction of the interpolation image generation unit 104 are illustrated. The interpolation image generation unit 104 includes, for example, an interpolation frame decider 301, a motion searcher 302 and an interpolation pixel generator 303. In the interpolation frame decider 301, a frame to be interpolated (interpolation frame) and a frame to be normally encoded without subject to interpolation (encoding frame) are determined in a unit of frame on the basis of, for example, the picture type.

Figure 4:
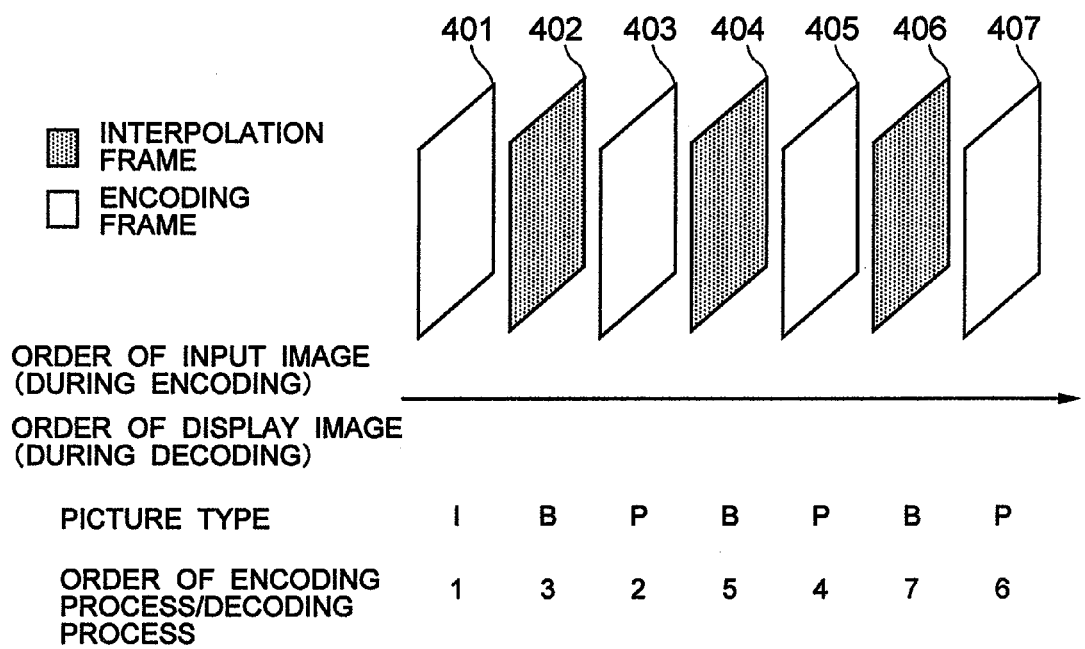
FIG. 4 is a diagram showing an example where interpolation frames and encoding frames are determined in accordance with the picture type in embodiment 1.

Reference will now made to FIG. 4 showing a specified example of interpolation frame determination by means of the interpolation frame decider 301 in interpolation image generation unit 104. In FIG. 4, abscissa represents order of inputting images during encoding and order of displaying images during decoding. On the contrary, order of encoding process during encoding and order of decoding process during decoding are as shown in FIG. 4. More particularly, a B picture undergoes encoding process and decoding process after a P picture whose display order is later than that of the B picture.

As will be described later with reference to FIG. 5, the interpolation pixel generator 303 in embodiment 1 generates, on the basis of a plurality of pictures to be subjected to an encoding process precedently (during decoding, subjected to a decoding process precedently), pixels of frames representing pictures each of which intervenes between the plurality of pictures in order of display. Namely, the interpolation pixel generation process by the interpolation pixel generator 303 according to embodiment 1 is a process suited for the B picture which is preceded and succeeded in order of display by respective pictures finished with encoding or decoding during encoding process or decoding process. In the example of FIG. 4, at the time of encoding process or decoding process of B picture 402, I picture 401 of preceding order of display and P picture 403 of succeeding order of display have already been finished with encoding or decoding. Further, at the time of encoding process or decoding process of B picture 404, P picture 403 of preceding order of display and P picture 405 of succeeding order of display have already been finished with encoding or decoding.

Accordingly, the interpolation frame decider 301 determines, for example, the B picture as an interpolation frame and the I picture and P picture as encoding objective frames, as shown in FIG. 4. Then, it is possible for the interpolation pixel generator 303 to generate a pixel positional value in terms of matrix element coordinates (hereinafter, simply referred to as a pixel value) of the B picture on the basis of the I picture and P picture which are forwardly and backwardly closest to the B picture, respectively.

While in the FIG. 4 example a picture structure is set up in which a single sheet of B picture is inserted between the I picture and P picture and between the P picture and P picture, the number of sheets of B pictures to be inserted between I or P pictures may be increased when a difference in brightness or color between frames is calculated and the difference is small, exhibiting a high correlation between the frames. In this case, too, the B pictures may be interpolation frames and the I picture and P picture may be encoding objective frames. Then, the interpolation pixel generator 303 may generate a pixel value of each B picture through the interpolation process on the basis of the I picture and P picture which are forwardly and backwardly closest to the B picture.

Figure 6:
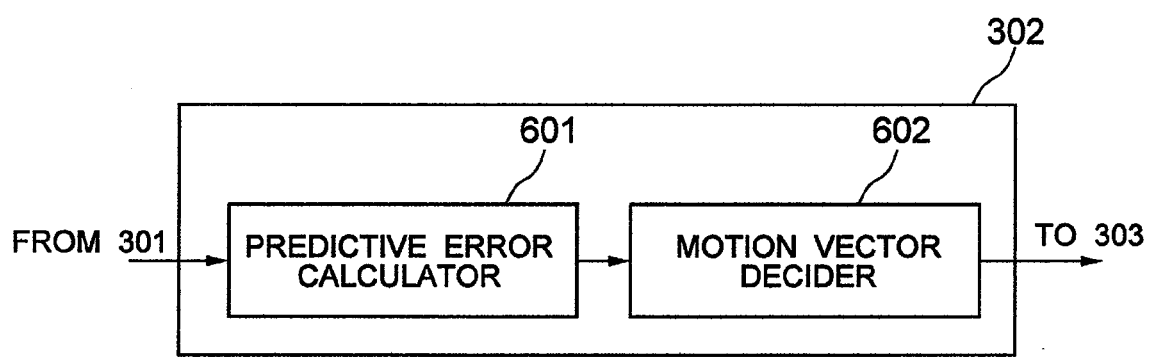
FIG. 6 is a diagram showing the construction of the motion searcher.

Next, by making reference to FIG. 6, the construction of motion searcher 302 will be described in detail. As shown in FIG. 6, the motion searcher 302 has a predictive error calculator 601 and a motion vector decider 602. After the interpolation frame decider 301 has determined an interpolation frame, the motion searcher 302 makes a search for a motion necessary to calculate the pixel value of the interpolation frame. As a motion search method, an area matching method widely used in general may be utilized.

Next, by making reference to FIG. 5, details of the process for generation of a pixel of an interpolation frame by means of the predictive difference calculator 601 and motion vector decider 602 included in the motion searcher 302 and interpolation pixel generator 303 as well will be described.

Figure 5:
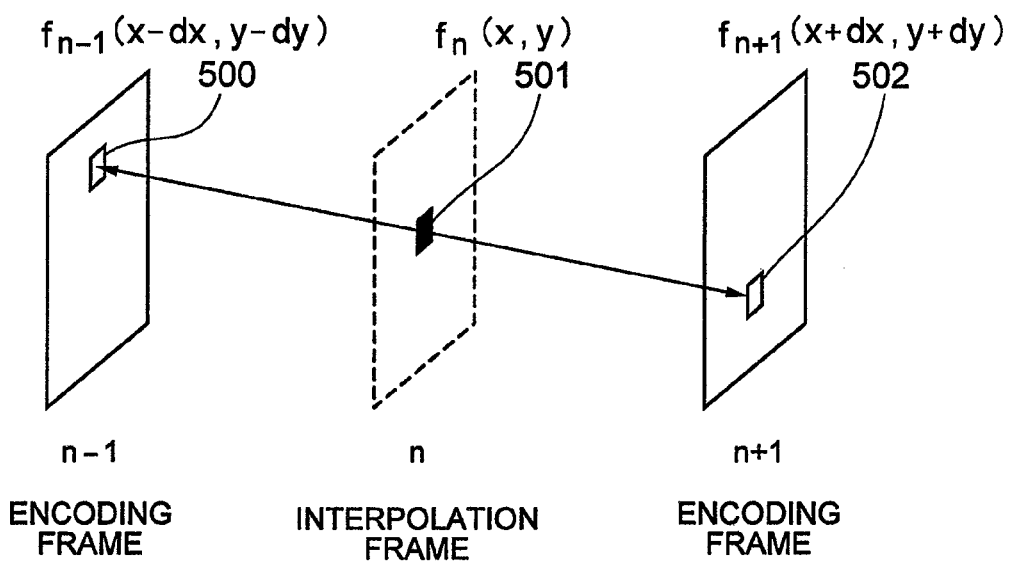
FIG. 5 is a diagram showing an example of a method for motion search by means of a motion searcher in embodiment 1.

In connection with FIG. 5, the predictive error calculator 601 first determines, in respect of an interpolation objective pixel 501 of interpolation frame n, a predictive error absolute value sum $SAD_n(x,y)$ indicated by equation (1) by using a pixel value $f_{n-1}(x-dx,y-dy)$ of a pixel 500 inside an encoding objective frame n−1 which precedes the interpolation frame n in order of display and a pixel value $f_{n+1}(x+dx,y+dy)$ of a pixel 502 inside an encoding objective frame n+1 which succeeds the interpolation frame n in order of display. Here, the pixels 500 and 502 are so determined as to lie on the same straight line as the interpolation objective pixel 501(x,y) in a frame of space and time. In equation (1), R represents the size of an image area to which the interpolation objective pixel belongs, n represents a frame number, x,y represent pixel coordinates, dx, dy, i, j represent inter-pixel differences and a,b represent number of the image area the interpolation objective pixel belongs to.

$$SAD_n(a, b) = \sum_{i,j \in R} |f_{n-1}(x - dx + i, y - dy + j) - f_{n+1}(x + dx + i, y + dy + j)| \quad (1)$$

Next, the motion vector decider 602 determines a combination $(dx_0,dy_0)$ of values by which the predictive error absolute value sum $SAD_n(x,y)$ in equation (1) is minimized and calculates a motion vector connecting a pixel of coordinates $(x-dx_0,y-dy_0)$ inside the encoding objective frame n−1 which precedes the interpolation frame n in order of display and a pixel $(x+dx_0,y+dy_0)$ inside the encoding objective frame n+1 which succeeds the interpolation frame n in order of display.

After completion of the motion vector calculation, the interpolation pixel generator 303 calculates an average of the pixel value $f_{n-1}(x-dx_0,y-dy_0)$ of the pixel inside the encoding objective frame preceding the interpolation frame and the pixel value $f_{n+1}(X+dx_0,y+dy_0)$ of the pixel inside the encoding objective frame succeeding the interpolation frame to generate a pixel value $f_n(x,y)$ of the interpolation objective pixel (x,y) by using equation (2).

$$f_n(x, y) = \frac{f_{n-1}(x - dx_0, y - dy_0) + f_{n+1}(x + dx_0, y + dy_0)}{2} \quad (2)$$

According to the pixel generation process for interpolation frame described above with reference to FIG. 5, a pixel of the interpolation frame can be generated from pixel values inside the encoding objective frames which are positioned before and after the interpolation objective frame in order of display, respectively.

In the example pursuant to equation (2), the interpolation pixel value is calculated from the simple average value but the interpolation pixel calculation method according to the present invention is not limited to that based on the simple average value. For example, if the time distance between encoding objective frame n−1 and interpolation frame n is not equal to the time distance between interpolation frame n and encoding objective frame n+1, the respective pixel values may be multiplied by weight coefficients complying with the respective time distances and thereafter, the resulting products may be added together. In other words, any method may be employed provided that the pixel value can be calculated from a function having a variable represented by pixel value $f_{n-1}(x-dx_0,y-dy_0)$ on the encoding objective frame n−1 and a variable represented by pixel value $f_{n+1}(x+dx_0,y+dy_0)$ on the encoding objective frame n+1.

Figure 7:
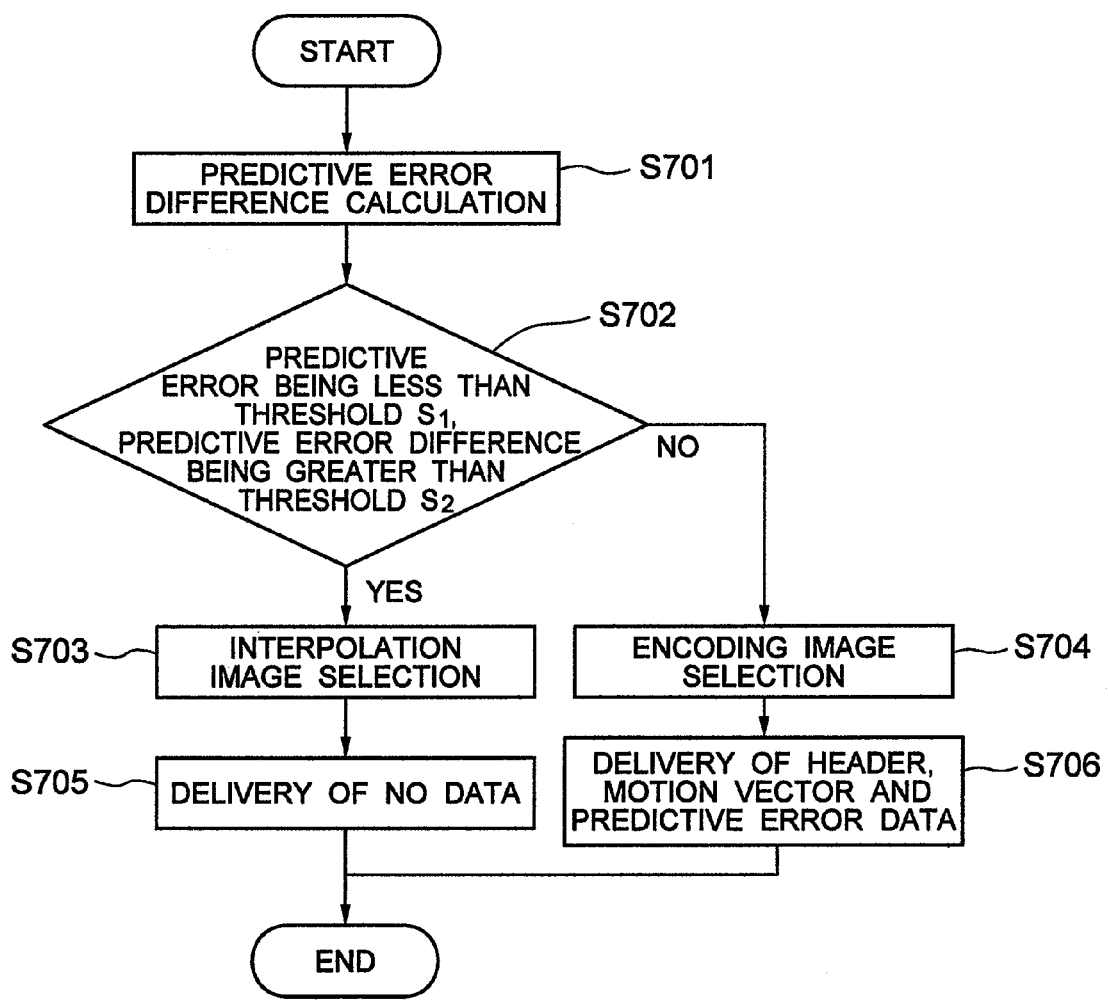
FIG. 7 is a flowchart of operation in the FIG. 1 interpolation image generation unit.

Turning now to FIG. 7, details of mode selection process by the mode selection unit 105 will be described. In respect of individual areas of plural divisional areas of the interpolation frame, the mode selection unit 105 makes a decision as to which one of the encoding objective image the encoding unit 103 generates and the interpolation image formed of the interpolation pixel the interpolation image generation unit 104 generates is to be selected.

Firstly, in respect of the encoding objective area, the mode selection unit 105 calculates pursuant to, for example, equation (3) a difference $f'(SAD_n(a,b))$ between a predictive error calculated by the motion searcher 302 and a predictive error of an area peripheral of the encoding objective area (S701). In equation (3), n represents frame number, a,b represent number of image area to which the interpolation objective pixel belongs and k,l represent a variable meaning the difference in number between the peripheral image area and the image area the interpolation objective pixel belongs to.

$$f(SAD_n(a, b)) = \sum_{k=-1}^{1} \sum_{i=-1}^{1} |SAD_n(a + k, b + l) - SAD_n(a, b)| \quad (3)$$

Subsequently, it is decided whether the minimum predictive error absolute value sum $SAD_n(a,b)$ determined pursuant to equation (1) by means of the motion searcher 302 is less than a threshold value $S_1$ or it is decided whether the predictive error difference absolute value sum f' ($SAD_n(a,b)$)) indicated by equation (3) is greater than a threshold value $S_2$ (S702). This decision is necessary because when the predictive error absolute value sum $SAD_n(a,b)$ is small, the reliability of results of motion detection during interpolation image generation is considered to be high and besides, when the predictive error difference absolute value sum f'($SAD_n(a,b)$)) is large, many encoding variables are generated for a normal encoding objective image but a slight degradation in picture quality of an area of complicated pattern is hardly perceived visually and therefore selection of the interpolation image is considered to be advantageous.

If the condition is met in step 702, the interpolation image is selected (S703). At that time, the process ends without outputting header information indicative of the kind of the prediction area, motion vector and predictive error data (S705). On the other hand, if the condition is not met in step S702, the encoding objective image is selected (S704). At that time, the header information indicative of the kind of the prediction area, motion vector and predictive error data are outputted to the encoded data memory unit 106 and then the process ends.

In other words, with the encoding objective image selected, the header information indicative of the kind of predictive area, motion vector and predictive error data are included in an encoding stream as in the case of the normal encoding technique. Contrary thereto, with the interpolation image selected, a decoded image can be generated without resort to the above data through the interpolation process explained in connection with FIG. 15 and therefore, these pieces of data are not included in the encoding stream. For the above reason, when the interpolation image is selected, the encoding data amount can be reduced, realizing improvements in compression rate.

While in the foregoing the mode selection for the encoding objective image and interpolation image has been described by way of example of selection in a unit of frame. But, of the B picture selected as the interpolation frame, a partial area may be selected for an encoding image and the other area may be selected for an interpolation image. The area concerned may be in a unit of block, for example.

Next, with reference to FIGS. 8A, 8B, 8C and 8D, an example of comparison of the encoded data amount of a frame encoded on the basis of the prior art encoding technique with that of a frame encoded by means of the video encoding apparatus and method according to embodiment 1 will be described. In FIGS. 8A, 8B, 8C and 8D, a shadowed area indicates an area in which an encoding objective image is selected and an unshadowed area indicates an area in which an interpolation image is selected.

Illustrated in FIG. 8A is a frame encoded in accordance with the conventional encoding technique. Since no interpolation image area exists in the conventional encoding technique, all areas provide encoding objective images. In the example of FIG. 8A, all of 24 areas are dedicated to encoding images. Then, in the conventional encoding technique, header information indicative of the kind of predictive area and information such as motion vector and predictive error data are stored, in respect of all of the frames in FIG. 8A as a rule, in an encoding stream. Here, the encoding stream for frames encoded with the conventional encoding technique is illustrated as shown in FIG. 8B. In the example of FIG. 8B, in respect of all areas of 24 encoding objective images, the header information indicative of the kind of predictive area and the information such as motion vector and predictive error data are stored in the encoding stream.

Contrarily, an example of a frame encoded in accordance with the video encoding apparatus and method according to embodiment 1 is as exemplified in FIG. 8C. In the example of FIG. 8C, encoding objective images are selected in only 8 out of 24 areas and interpolation images are selected in the remaining 16 areas. Then, an encoding stream corresponding to the FIG. 8C example is formed as illustrated in FIG. 8D. Namely, in the encoding process based on the video encoding apparatus and method according to embodiment 1, there is no need of providing for the encoding side the header information indicative of the kind of predictive area and the information such as motion vector and predictive error data in respect of areas for which the interpolation image is selected and these areas are not included in the encoding stream. In the example of FIG. 8D, the header information indicative of the type of predictive area and the information such as motion vector and predictive error data are included in an encoding stream every 8 areas representing encoding objective areas.

Thus, in the video encoding apparatus and method according to embodiment 1, the amount of encoding data to be included in the encoding stream can be reduced as compared to that in the conventional encoding technique, thereby materializing improvements in the encoding compression rate.

Referring now to FIGS. 9A, 9B and 9C and FIGS. 8A, 8B, 8C and 8D, a process for encoding a motion vector executed in the variable-length encoding unit 107 of video encoding apparatus according to embodiment 1 of the invention will be described.

Firstly, in a process for encoding a motion vector in an encoding objective area pursuant to the H.264 standard covering the conventional encoding technique, a motion predictive vector is calculated from a median of motion vectors in areas peripheral of the encoding objective area and only a difference between the motion vector in the encoding objective area and the motion predictive vector is handled as encoding data, thus reducing the data amount.

In the variable-length encoding unit 107 according to embodiment 1, too, a predictive motion vector (PMV) is calculated, a difference vector (DMV) between a motion vector (MV) in the encoding objective area and the predictive motion vector (PMV) is calculated and the difference vector (DMV) is treated as encoding data. But, in a frame to be encoded in accordance with the video encoding apparatus and method according to embodiment 1, encoding objective image areas and interpolation image areas coexist as shown in FIG. 8C and therefore, for calculation of the predictive motion vector (PMV), a method different from the conventional encoding technique under H.264 standard is adopted.

A specified example of the technique based on the conventional H.264 standard will first be described with reference to FIG. 9A. Under the H.264 standard, a predictive motion vector (PMV) for an encoding objective area X is calculated by using a median of motion vectors used for encoding processes in areas A, B and C which are close to the encoding objective area X and which have been encoded in advance of the encoding objective area X. For calculation of the predictive motion vector, a process in common to the encoding and decoding processes needs to be executed.

Here, the process for encoding the motion vector in embodiment 1 of the invention will be described. The motion vector encoding process in embodiment 1 of the invention is a process to be applied to only an encoding objective image area out of encoding objective image area and interpolation image area. For the interpolation image area, a motion search is carried out for interpolation image on the decoding side and therefore the motion vector encoding process is unnecessary.

Here, in the motion vector encoding process in embodiment 1 of the invention, depending on whether blocks A,B,C and D close to the encoding objective area X shown in FIGS. 9A, 9B and 9C are encoding objective image areas, respectively, or interpolation image areas, respectively, a process for calculation of a predictive vector used for motion vector encoding process is changed. Detailed process for respective cases will be described hereunder.

Firstly, when any peripheral areas A,B and C are encoding objective image areas, a predictive motion vector is calculated by using a median of motion vectors ($MV_A, MV_B, MV_C$) used for the encoding process in the peripheral areas A, B and C as in the case of the conventional H.264 standard.

Next, an instance will be described in which interpolation image areas are included in areas peripheral of the encoding objective area X as shown in FIGS. 9B and 9C. As described previously, the motion vector is not encoded for the interpolation image area, that is, the motion vector used in the encoding process is not transmitted to the decoding side. This accounts for the fact that with the motion vector used in the encoding process utilized for calculation of a predictive motion vector (PMV), calculation of the predictive motion vector (PMV) cannot be carried out in decoding. Therefore, calculation of a predictive motion vector (PMV) is executed in embodiment 1 as below.

Firstly, in an instance where areas peripheral of the encoding objective area X are all occupied by interpolation image areas as shown in FIG. 9B, a motion vector used in the interpolation image generation process, that is, the motion vectors ($MVC_A, MVC_B, MVC_C$) calculated by the motion searcher 302 of interpolation image generation unit 104 are used. If the motion search in motion searcher 302 is carried out in a unit of pixel, a plurality of motion vectors exist in each area and so the predictive motion vector PMV is calculated by using a mean value of the plural motion vectors. Then, a median of the motion vectors ($MVC_A, MVC_B, MVC_C$) is calculated as a predictive motion vector (PMV).

Next, in an instance where the A,B and C areas peripheral of the encoding objective area X are partly encoding objective image areas and partly an interpolation image area as shown in FIG. 9C, a motion vector MV used in the encoding process is used for the encoding image area and a motion vector MVC used in the interpolation image generation process is used for the interpolation image area and a median of these motion vectors is calculated as a predictive motion vector (PMV).

Namely, in the FIG. 9C example, the peripheral areas A and C are encoding objective image areas and the peripheral area B is an interpolation image area. In this case, as shown at (1) in FIG. 9C, a median of the motion vectors ($MV_A, MVC_B, MV_C$) is calculated as a predictive motion vector (PMV).

As a modified example of calculation of a predictive motion vector (PMV) in the case where A,B and C areas peripheral of the encoding objective area X is partly encoding objective image areas and partly an interpolation image area as shown in FIG. 9C, a motion vector of the encoding image area may be selected preferentially and used. For example, when a peripheral area D positioned left above the encoding objective area X is an encoding image area in the FIG. 9C example, the $MVC_B$ of the peripheral area B representing the interpolation image area is not used but a motion vector $MV_D$ used in the encoding process of peripheral area D is used. Then, a median of the motion vectors ($MV_A, MV_C, MV_D$) is calculated as a predictive motion vector (PMV).

If two of the peripheral areas A,B,C and D are encoding objective image areas, an average value of motion vectors MV of the two areas may be used as a predictive motion vector (PMV). If one of the peripheral areas A,B,C and D is an encoding objective image area, one motion vector MV may be used by itself as a predictive motion vector (PMV).

By preferentially selecting a motion vector of an encoding objective image area in this manner, an influence the error in search between the motion search in the interpolation image generation process on the encoding side and the motion search in the interpolation image generation process on the decoding side has can be reduced.

As described above, according to the video encoding apparatus and method according to embodiment 1, the data compression rate can be improved.

Figure 10:
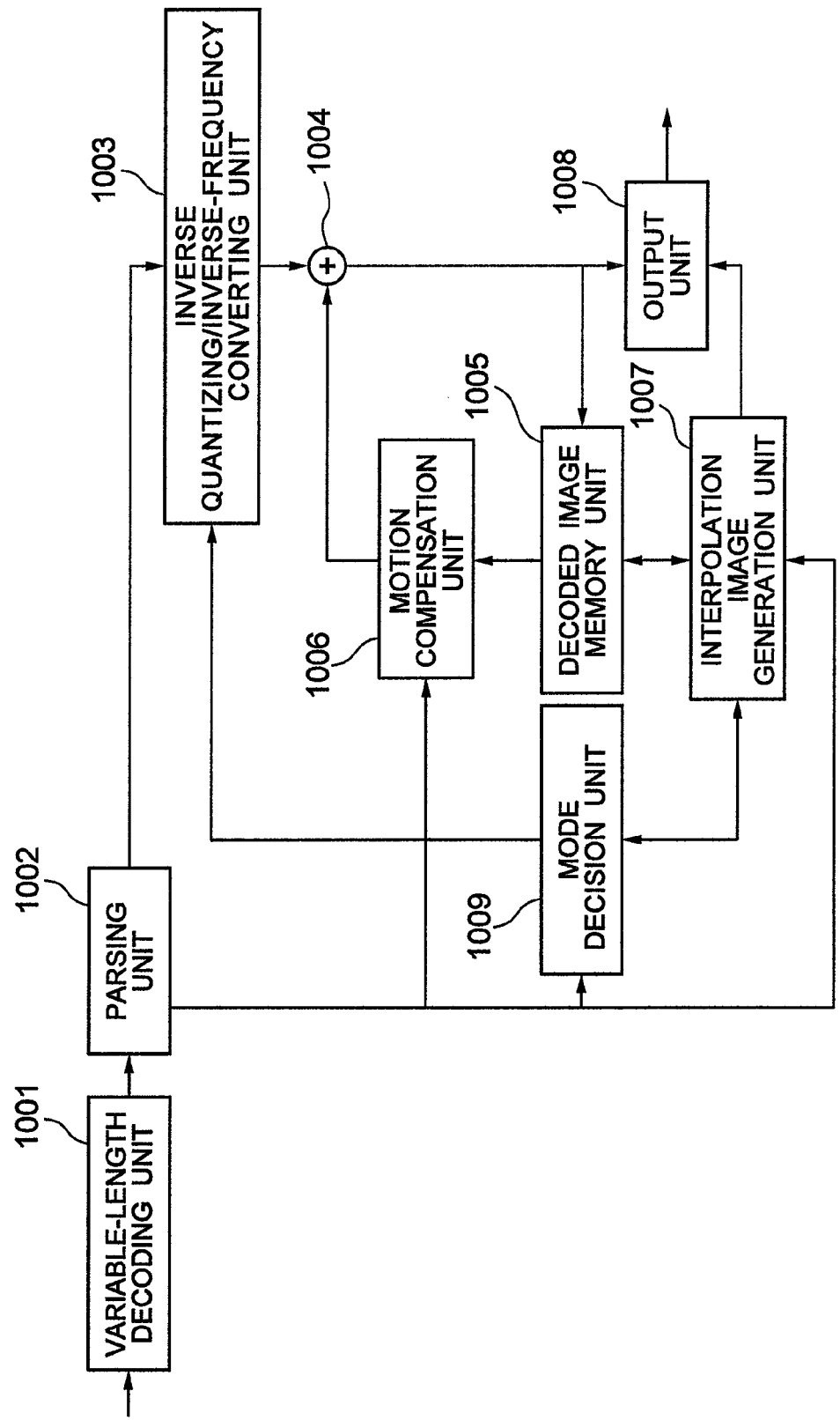
FIG. 10 is a schematic block diagram showing the configuration of a video decoding apparatus in embodiment 1.

Reference will now made to FIG. 10 to describe a video decoding apparatus according to embodiment 1. The video decoding apparatus according to embodiment 1 comprises, for example, a variable-length decoding unit 1001 for decoding encoded data transmitted from the encoding side, a parsing unit 1002 for parsing data subjected to variable-length decoding, a mode deciding unit 1009 for making a decision, on the basis of the result of the parsing by means of the parsing unit 1002 and the result of the predictive error calculation by mans of an interpolation image generation unit 1007, as to whether a decoding process or an interpolation image generation process is to be carried out, an inverse quantizing/inverse-frequency converting unit 1003 for causing data transmitted from the parsing unit 1002 to be applied with inverse quantization/inverse-frequency conversion, an adder 1004 for adding data outputted from the inverse quantizing/inverse-frequency converting unit 1003 to a predictive image generated by a motion compensation unit 1006, a decoded image memory unit 1005 for storing data outputted from the adder 1004, the motion compensation unit 1006 being operative to mutually compensate pieces of data stored in the decoded image memory unit 1005 for their motions, the interpolation image generation unit 1007 being operative to perform a motion search process and an interpolation pixel generation process by using the pieces of data obtained from the parsing unit 1002 and decoded image memory unit 1005 to thereby generate an interpolation image, and an output unit 1008 for outputting to a video display unit either of the interpolation image generated by the interpolation image generation unit 1007 and the decoded image delivered out of the adder 1004.

Details of operation in the individual processing units in the video decoding apparatus according to embodiment 1 will be described hereunder.

Figure 11:
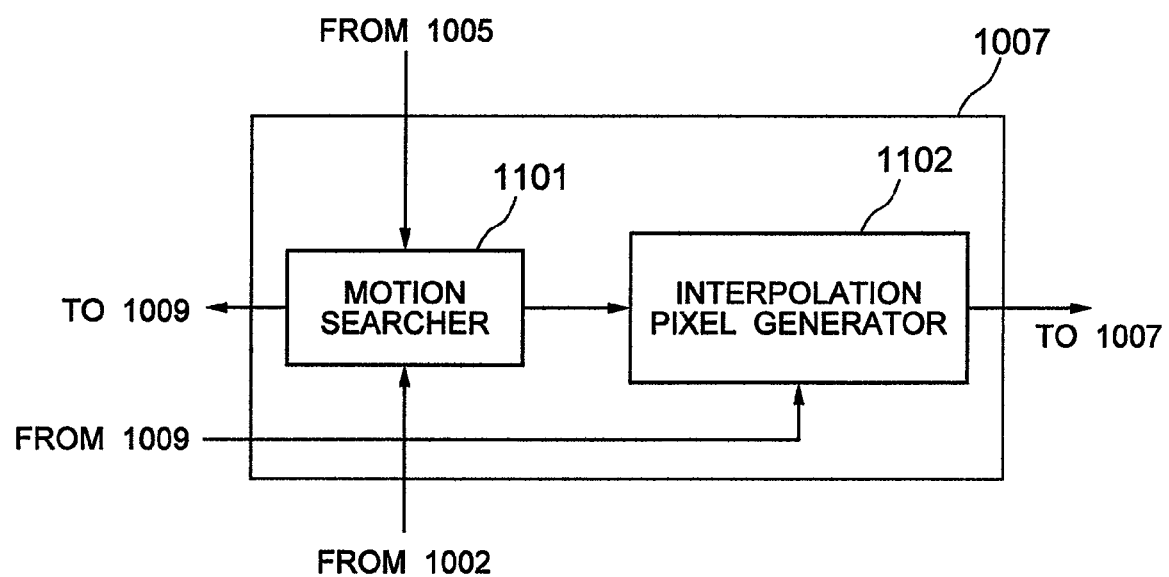
FIG. 11 is a block diagram showing the construction of an interpolation image generation unit in FIG. 10.

Firstly, by making reference to FIG. 11, details of the interpolation image generation unit 1007 will be described. The interpolation image generation unit 1007 includes a motion searcher 1101 and an interpolation pixel generator 1102. The motion searcher 1101 performs a process similar to that by the motion searcher 302 in FIG. 3 and the interpolation pixel generator 1102 performs a process similar to that by the interpolation pixel generator 303 in FIG. 3. Like the motion searcher 302, the motion searcher 1101 has a predictive error calculator 601 and a motion vector decider 602 and as in the course of encoding process, executes a predictive error calculation process and a motion vector calculation process. The predictive error calculation process and motion vector calculation process and the interpolation image generation process by means of the motion searcher 302 and interpolation pixel generator 303 are the same as those already described previously in connection with FIG. 5 and will not be described herein.

Figure 12:
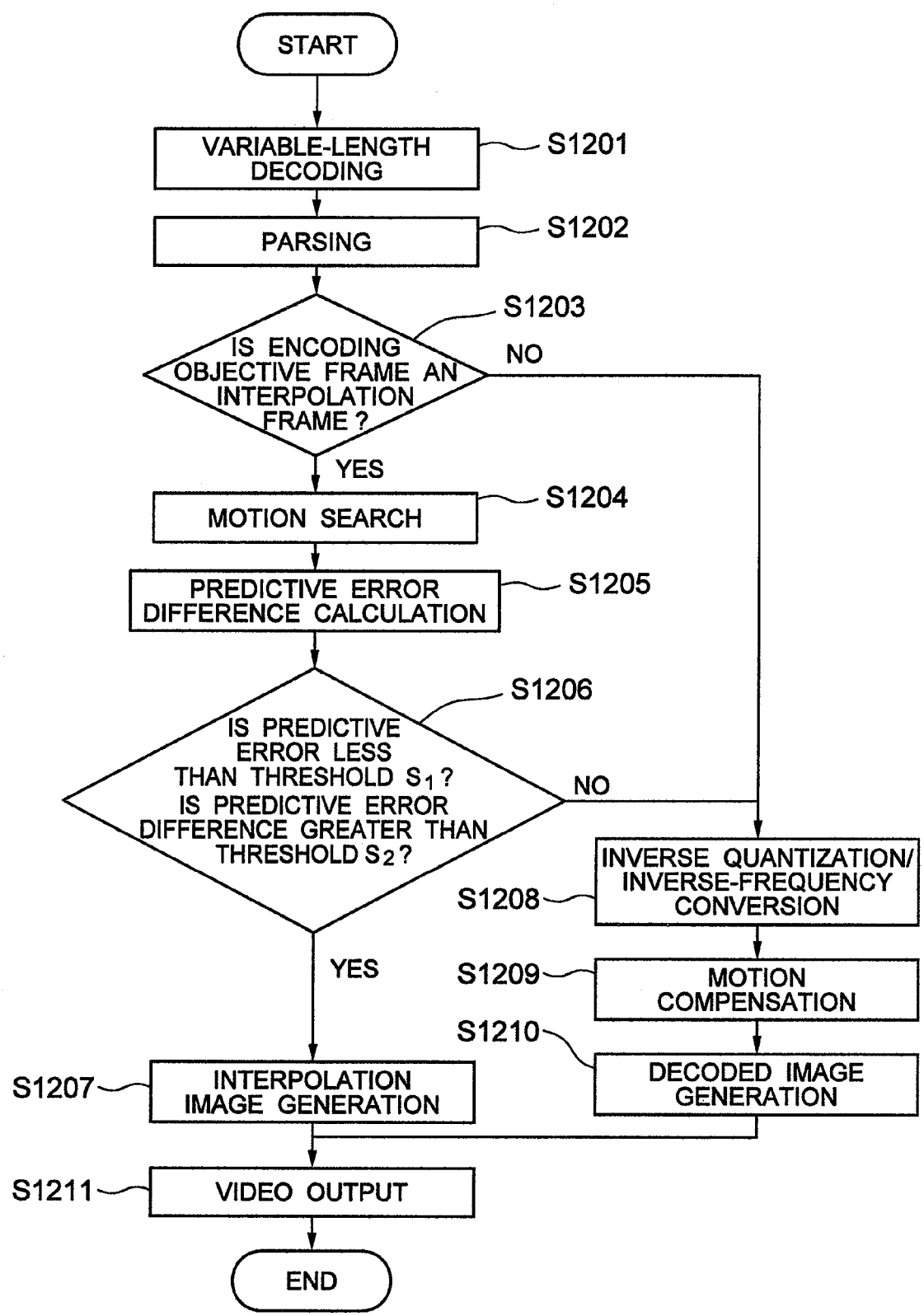
FIG. 12 is a flowchart showing operation in the video decoding apparatus in embodiment 1.

Turning now to FIG. 12, flow of process in the video decoding method conducted with the video decoding apparatus according to embodiment 1 will be described. The process proceeds in respect of, for example, each area. Firstly, the encoding stream is decoded by means of the variable-length decoding unit 1001 and is then sent to the parsing unit 1002 (S1201). Subsequently, in the parsing unit 1002, the decoded stream data is sorted in parsing and the encoded data is transmitted to the inverse quantizing/inverse-frequency converting unit 1003 and interpolation image generation unit 1007 (S1202). Thereafter, in the paring unit 1002, the picture type of the encoding objective frame is decided to make a decision as to whether the encoding objective frame is an encoding frame or an interpolation frame (S1203). If the encoding objective frame is an interpolation frame, the interpolation image generation unit 1007 performs a motion search process in respect of a decoding objective area by using plural decoded image areas which precedes and succeeds the objective frame in order of display time (S1204). Through a process similar to that effected by the motion searcher 302 in FIG. 3, the motion searcher 1101 calculates a minimum predictive error absolute value sum $SAD_n(a,b)$ and determines a motion vector. Next, the mode decider 1009 calculates a difference f' ($SAD_n(a,b)$) between the predictive error absolute value sum calculated by the motion searcher 1101 and a predictive error absolute value sum peripheral of the decoding objective area (S1205). Subsequently, the mode decider 1009 decides whether the minimum predictive error absolute value sum $SAD_n(a,b)$ calculated by the motion searcher 1101 is less than a threshold value $S_1$ or whether the difference f' ($SAD_n(a,b)$) from the peripheral predictive error absolute value sum is greater than a threshold value $S_2$ (S1206). With the predictive error absolute value sum $SAD_n(a,b)$ determined as being less than the threshold value $S_1$ or with the predictive error difference absolute value sum f' ($SAD_n(a,b)$) determined as being greater than the threshold value $S_2$, the decoding objective area is determined to be an interpolation image area. In the other case, the decoding objective area is determined as an area which has been encoded as an encoding objective image area.

Now, when the decoding objective area is determined as an interpolation image area by means of the mode decider 1009, the interpolation pixel generator 1102 of interpolation image generation unit 1007 generates an interpolation pixel, and an image is generated through a process for generation of an interpolation image and stored in the decoded image memory unit 1007 (S1207).

On the other hand, if the encoding objective frame is not an interpolation frame (as being an encoding frame) or in case the mode decision unit 1009 determines that the decoding objective area is an area encoded as an encoding objective image area, the inverse quantizing/inverse-frequency converting unit 1003 applies an inverse quantization/inverse-frequency conversion process to the encoded data obtained from the parsing unit 1002 and decodes difference data (S1208). Thereafter, the motion compensation unit 1006 conducts a motion compensation process by suing header information obtained from the parsing unit 1002 and the motion vector, generating a predictive image (S1209). Subsequently, the adder 1004 adds the predictive image generated by the motion compensation unit 1006 and the difference data outputted from the inverse quantizing/inverse-frequency converting unit 1003 to generate a decoded image which in turn is stored in the decoded image memory unit 1005 (S1210). Finally, the output unit 1008 outputs the interpolation image generated in step 1207 or the decoded image generated in step 1210 (S1211), ending the process.

To add, if the encoding objective area is based on inter-screen prediction in step 1209, the motion compensation unit 1006 calculates a predictive motion vector (PMV) on the basis of motion vectors of areas peripheral of the decoding objective area, adds it to a difference vector (DMV) to be stored in the encoding data to thereby generate a motion vector (MV) of the decoding objective area and performs a motion compensation process on the basis of the motion vector (MV). It is noted that the calculation process for the predictive motion vector (PMV) can be executed through a process similar to the calculation process for the predictive motion vector (PMV) on the encoding side as has been explained in connection with FIG. 9A to 9C and will not be described herein.

According to the video decoding apparatus and method of embodiment 1 described previously, data encoded through the encoding method capable of improving the data compression rate as compared to the conventional encoding apparatus and method can be decoded suitably.

According to the video encoding apparatus and method and the video decoding apparatus and method of embodiment 1 described in the foregoing, encoded data improved in data compression rate can be generated and the encoded data can be decoded preferably.

Embodiment 2

Next, embodiment 2 of the present invention will be described. Embodiment 2 of the invention differs from embodiment 1 in that flag data indicating whether an encoding objective image is selected or an interpolation image is selected in respect of each encoding objective area on the encoding side is included in an encoding stream. This enables the decoding side to easily makes a decision as to whether an encoding image or an interpolation image is selected in respect of the decoding objective area. As a result, the process during decoding can be simplified, reducing the amount of processing. Embodiment 2 will be described in greater detail hereinafter.

Figure 13:
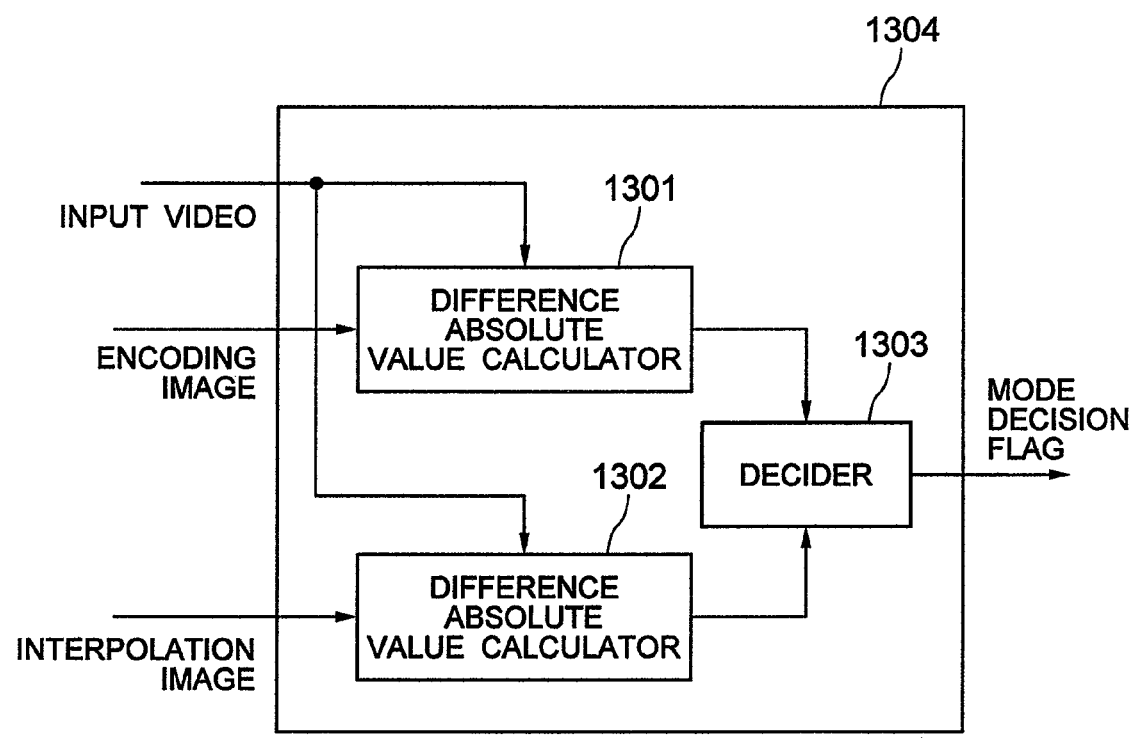
FIG. 13 is a block diagram showing the construction of a mode selecting unit according to embodiment 2 of the invention.

In a video encoding apparatus according to embodiment 2, the mode selection unit 105 in FIG. 1 in the video encoding apparatus of embodiment 1 is replaced with a mode selection unit 1304 in FIG. 13. The construction and operation of the remaining components are the same as those in embodiment 1 and will not be described herein.

Firstly, in the mode selection unit 1304, a difference absolute value calculator 1301 calculates a difference between an input video divided by the area division unit 102 and an interpolation image generated by the interpolation image generation unit 104. Similarly, a difference absolute value calculator 1302 calculates a difference between the input video divided by the area division unit 102 and an encoding objective image generated by the encoding unit 103. Next, in a decider 1303, a smaller one of the difference absolute values calculated by the difference absolute value calculators 1301 and 1302 is selected, so that a decision flag (mode decision flag) is outputted. For example, the mode decision flag may be "0" when the encoding objective image is selected and "1" when the interpolation image is selected.

Illustrated in FIGS. 14A and 14B is an example of data stored in the encoded data memory unit 106 of the video encoding apparatus in embodiment 2. As will be seen from FIGS. 14A and 14B, flag data of one bit indicating that either the encoding objective image and the interpolation image is selected in respect of each encoding objective area is added. More particularly, in the encoding stream outputted from the video encoding apparatus of embodiment 2, the flag data indicating that either the encoding objective image and the interpolation image is selected in respect of each encoding objective area is included. Through this, without resort to the calculation process and comparison process performed on the decoding side in respect of the predictive error absolute value sum $SAD_n(a,b)$ and predictive error difference f' $(SAD_n(a,b))$ as in the case of embodiment 1, it is possible to decide whether the decoding objective area is an area for which an encoding objective image is selected or an interpolation image is selected. Consequently, the process during decoding can be simplified and the processing amount can be reduced.

According to the video encoding apparatus and method in embodiment 2 described as above, being different from embodiment 1, the flag data indicating that either the encoding image and the interpolation image is selected in respect of each encoding objective area is included in the output encoding stream. This enables the decoding side to easily decide in respect of the decoding objective area whether the encoding objective image area is selected or the interpolation image area is selected. Accordingly, the process during decoding can be simplified and the processing amount can be reduced.

Next, a video decoding apparatus according to embodiment 2 will be described. The decoding apparatus of embodiment 2 is constructed similarly to that shown in FIG. 10 in connection with embodiment 1 and will not therefore be described herein.

Flow of process in the video decoding apparatus in embodiment 2 will be described below with reference to FIG. 15.

In an encoding stream, flag data indicating whether an encoding objective image or an interpolation image is selected in respect of each encoding objective area is included as shown in FIGS. 14A and 14B, and the encoding stream is inputted to the video decoding apparatus according to embodiment 2. Firstly, the encoding stream is decoded by means of the variable-length decoding unit 1001 and sent to the parsing unit 1002 (S1501). Subsequently, in the parsing unit 1002, the decoded stream data is sorted in parsing and header information and a mode decision flag are transmitted to the mode decision unit 1009 whereas the encoded data is transmitted to the inverse quantizing/inverse-frequency converting unit 1003 (S1502). Thereafter, in the parsing unit 1002 or mode decision unit 1009, the encoding objective frame is decided, in accordance with the picture type of the encoding objective frame, as to whether to be an encoding frame or an interpolation frame (S1503).

Here, if the encoding objective frame is an interpolation frame, the mode decision unit 1009 decides in respect of a decoding objective area whether the mode decision flag transmitted from the parsing unit 1002 is 1 or 0 (S1504). With the mode decision flag being 1 (indicative of an area for which an interpolation image is selected), the decoding objective area is determined to correspond to an interpolation image area. When the mode decision flag is 0 (indicating an area for which an encoding image is selected), the decoding objective area is determined to correspond to an area which has been encoded as an encoding objective image area.

Then, as the mode decision unit 1009 determines that the decoding objective area is an interpolation image area, the motion searcher 1101 of interpolation image generation unit 1007 makes a motion search (S1505). Subsequently, on the basis of a result of the motion search by means of the motion searcher 1101, the interpolation pixel generator 1102 generates an interpolation pixel and an image is generated through a process for generation of an interpolation image and stored in the decoded image memory unit 1005 (S1506).

On the other hand, in case the encoding objective frame is not an interpolation frame (instead, an encoding objective frame) or the mode decision unit 1009 determines that the decoding objective area corresponds to an area encoded as an encoding objective image area, the inverse quantizing/inverse-frequency converting unit 1003 applies an inverse quantization/inverse-frequency conversion process to the encoded data acquired from the parsing unit 1002 and decodes difference data (S1507). Next, the motion compensation unit 1006 executes a motion compensation process by using the header information captured from the parsing unit 1002 and the motion vector and creates a predictive image (S1508). Next, the adder 1004 adds the predictive image generated by the motion compensation unit 1006 and the difference data delivered out of the inverse quantizing/inverse-frequency converting unit 1003, generating a decoded image which in turn is stored in the decoded image memory unit 1005 (S1509). Finally, the output unit 1008 outputs the interpolation image generated in the step S1207 or the decoded image generated in the step S1210 (S1510), ending the process.

As set forth so far, according to the video decoding apparatus and method in embodiment 2, in addition to attainment of the effects attributable to embodiment 1, it is possible to attain such an advantage that without resort to the calculation process and comparison process for the predictive error absolute value sum $SAD_n(a,b)$ and predictive error difference absolute value sum f' $(SAD_n(a,b))$ as performed in embodiment 1, the decoding objective area can be decided as to whether to correspond to an area for which the encoding image is selected or an area for which the interpolation image is selected. Accordingly, the process during decoding can be simplified and the processing amount can be reduced.

As set forth so far, according to the video encoding apparatus and method and video decoding apparatus and method in embodiment 2, encoded data improved in data compression rate can be generated and the encoded data can be decoded preferably.

Embodiment 3

Next, embodiment 3 of the present invention will be described. In embodiment 1 of the invention, on the basis of a plurality of pictures which undergo the encoding process in advance (during decoding, the decoding process is carried out in advance), the interpolation image generation unit 104 generates a pixel of a frame representing a picture preceding and succeeding the plurality of pictures in order of display is generated through the interpolation process (particularly signifying interpolation per se).

Contrarily, in embodiment 3 of the invention, a process of interpolation discriminating from the interpolation per se (hereinafter referred to as extrapolation) is added through which on the basis of a plurality of pictures which undergo the encoding process in advance (during decoding, the decoding process is carried out in advance), a pixel of a frame representing a picture preceding or succeeding the plurality of pictures in order of display is generated through the extrapolation process.

A description of detailed construction and operation will be given of the video encoding apparatus in embodiment 3 hereinafter.

Structurally, the video encoding apparatus according to embodiment 3 is constructed by adding, to the interpolation image generation unit 104 of the video encoding apparatus of embodiment 1, operation of interpolation image generation process based on backward extrapolation and an extrapolation direction decision unit 1805 (see FIG. 18) is so added as to follow the interpolation image generation unit 104. The construction and operation of the remaining components are similar to those in embodiment 1 and will not be described herein.

The extrapolation process to be added herein is sorted into two types, namely, a forward extrapolation process and a backward extrapolation process. With respect to the respective types, operation in the interpolation image generation unit 104 of video encoding apparatus will be described.

Firstly, the forward extrapolation process will be described. Here, an example will be described in which in an input video as shown at (a) in FIG. 16, an extrapolation image of an extrapolation objective frame 1603 (B picture) is generated by using two encoding frames 1601 and 1602 which precedes the extrapolation objective frame 1603 in order of display.

In this case, for the purpose of determining a pixel of the extrapolation objective frame, a motion search to be described below is carried out in the motion searcher 302. As shown at (a) in FIG. 17, by using pixel values of two encoding objective frames (1601, 1602) displayed precedently of the extrapolation objective frame 1603, a predictive error absolute value sum $SAD_n(a,b)$ indicated in equation (4) is determined. Specifically, a pixel value $f_{n-2}(x-2dx,y-2dy)$ of a pixel 1700 on the encoding frame 1601 and a pixel value $f_{n-1}(x-dx,y-dy)$ of a pixel 1701 on the encoding frame 1602 are used. Here, R represents the size of an objective area to which the interpolation objective pixel belongs. Then, the pixel 1700 on encoding frame 1601 and the pixel 1701 on encoding frame 1602 are so determined as to lie on the same straight line as the extrapolation objective pixel 1702 on the extrapolation objective frame 1603 in a frame of space and time.

$$SAD_n(a, b) = \sum_{i,j \in R} |f_{n-1}(x - dx + i, y - dy + j) - f_{n-2}(x - 2dx + i, y - 2dy + j)| \quad (4)$$

Next, a position (dx,dy) at which the predictive error absolute value sum indicated by equation (4) is minimized is determined and through a process similar to that in the interpolation pixel generation unit 303 described in connection with embodiment 1, an extrapolation objective pixel is generated.

As described above, generation of an extrapolation objective pixel based on the forward extrapolation process can be realized.

Figure 16:
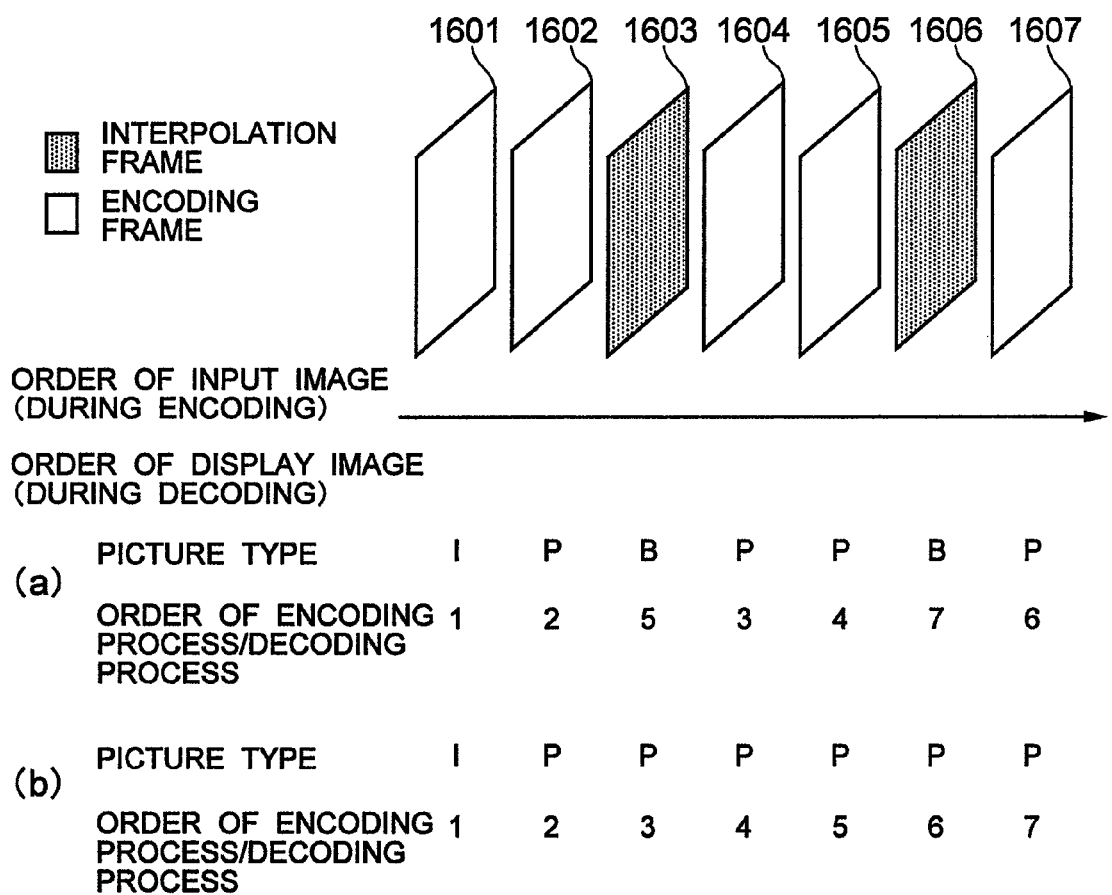
FIG. 16 is a diagram showing an example where interpolation frames and encoding frames are determined in accordance with the picture type in embodiment 3.

The above-described forward extrapolation process can be applicable provided that the two preceding encoding frames in order of display are encoded/decoded in advance and therefore, it can also be applied to the case of an extrapolation objective frame 1603 (P picture) as shown at (b) in FIG. 16.

Next, a backward extrapolation process will be described.

Here, an example will be described in which in the input video shown at (a) in FIG. 16, an extrapolation image of an extrapolation objective frame 1603 is generated by using two encoding frames 1604 and 1605 which succeeds the extrapolation objective frame 1603 in order of display.

In this case, for the purpose of determining a pixel of the extrapolation objective frame, a motion search to be described below is carried out in the motion searcher 302. As shown at (b) in FIG. 17, by using pixels inside the two encoding frames (1604, 1605) displayed backwardly of the extrapolation objective frame 1603, a predictive error absolute value sum $SAD_n(x,y)$ indicated in equation (5) is determined. Specifically, a pixel value $f_{n+1}(x+dx,y+dy)$ of a pixel 1711 on the encoding frame 1604 and a pixel value $f_{n+2}(x+2dx,y+2dy)$ of a pixel 1712 on the encoding frame 1605 are used. Here, R represents the size of an objective area to which the extrapolation objective pixel belongs.

Here, the pixel 1711 on encoding frame 1604 and the pixel 1712 on encoding frame 1605 are so determined as to lie on the same straight line as the extrapolation objective pixel 1710 on the extrapolation objective frame 1603 in a frame of space and time.

$$SAD_n(a, b) = \sum_{i,j \in R} |f_{n-1}(x + dx + i, y + dy + j) - f_{n+1}(x + 2dx + i, y + 2dy + j)| \quad (5)$$

Next, a position (dx,dy) at which the predictive error absolute value sum indicated by equation (5) is minimized is determined and through a process similar to that in the interpolation pixel generation unit 303 described in connection with embodiment 1, an extrapolation objective pixel is generated.

As described above, generation of an extrapolation objective pixel based on the backward extrapolation process can be realized.

In the interpolation image generation unit 104, the aforementioned two kinds of extrapolation process and the interpolation process similar to that in embodiment 1 are carried out, generating three kinds of interpolation images.

Figure 18:
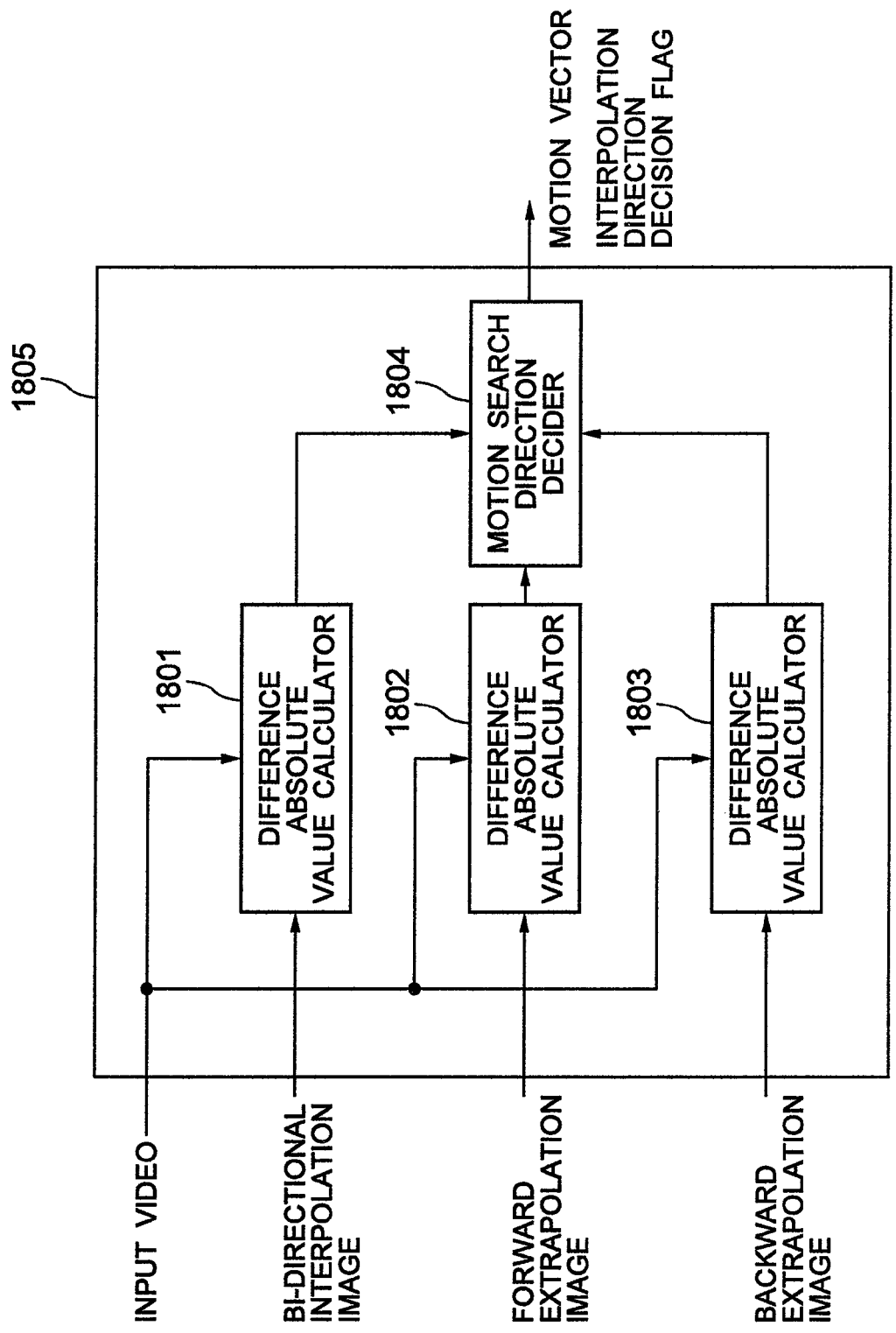
FIG. 18 is a block diagram showing the construction of an interpolation direction decision unit in embodiment 3.

Next, in the interpolation direction decision unit 1805 shown in FIG. 18, a motion search method is decided. The process in the interpolation direction decision unit 1805 will be described. Firstly, a difference absolute value between an interpolation image generated by performing a bi-directional motion search described in embodiment 1 and an input image is calculated by means of a difference absolute value calculator 1801. Subsequently, a difference absolute value between an interpolation image generated by performing a forward motion search described in the present embodiment and the input image is calculated by means of a difference absolute value calculator 1802. Also, a difference absolute value between an interpolation image generated by performing a backward motion search and the input image is calculated by means of a difference absolute value calculator 1803. Thereafter, a motion search direction decider 1804 selects an interpolation image for which the difference between input image and interpolation image is small and outputs the selected result as a motion search direction decision flag. For example, the motion search direction decision flag may provide data of 2 bits including 00 indicative of bi-direction, 01 indicative of forward direction and 10 indicative of backward direction. The thus generated motion search direction decision flag is transmitted to the encoded data memory unit 106.

Illustrated in FIGS. 19A and 19B is an example of data to be stored in the encoded data memory unit 106. As shown in FIGS. 19A and 19B, flag data for deciding which direction the interpolation image is generated from is added in an interpolation pixel area. In other words, in an encoding stream outputted from the video encoding apparatus of embodiment 3, the flag data indicative of the interpolation direction in which the interpolation image is generated in respect of an area for which the interpolation image is selected is included.

In this manner, the kind of interpolation image generation methods can be increased and in addition to a B picture, a P picture can also be made to be an interpolation objective frame, thus decreasing the data.

Further, in the case of B picture, in addition to the bi-directional interpolation based on frames respectively preceding and succeeding the interpolation objective frame, the forward extrapolation for generating an interpolation image from two forward encoding objective frames and the backward extrapolation for generating an interpolation image from two backward encoding objective frames as well can be executed and improvements in picture quality can therefore be expected.

Especially, in the case of an image which moves differently in the background and the foreground, the picture quality is degraded considerably in an area in which when the interpolation image is generated only bi-directionally, the background is concealed by the foreground and cannot be seen (occlusion area) but through the forward or backward extrapolation, the problem of quality degradation can be solved.

As described above, differing from embodiment 1, the video encoding apparatus and method according to embodiment 3 includes the flag data indicative of the interpolation direction for generation of an interpolation image in the output encoding stream. This ensures that the kinds of interpolation process executed on the decoding side can be increased and in addition to the B picture, the P picture can also be an interpolation objective frame, making it possible to more reduce the data. Further, the high picture quality of the B picture interpolation image can be achieved.

Next, a video decoding apparatus according to embodiment 3 will be described. Structurally, in the decoding apparatus of embodiment 3, the motion searcher 1101 shown in FIG. 11 in embodiment 1 is replaced with a motion searcher 2005 in FIG. 20 and the remaining components are similar to those in embodiment 1 and a description will not be given of them.

The motion search unit 2005 in the decoding apparatus of embodiment 3 includes a motion search method decider 2001, a motion searcher 2002, a predictive error calculator 2003 and a motion vector decider 2004. The motion search method decider 2001 determines a search method of bi-directional, forward direction or backward direction motion in accordance with information of a motion search direction decision flag sent from the parsing unit 1002. After a motion search method has been determined, motion search, predictive error calculation and motion vector decision are carried out in the motion searcher 2002, predictive error calculator 2003 and motion vector decider 2004, respectively. The bi-directional search can be conducted similarly to that in embodiment 1 and the forward direction search and backward direction search can be processed similarly to those by the video encoding apparatus of the present embodiment.

Figure 21:
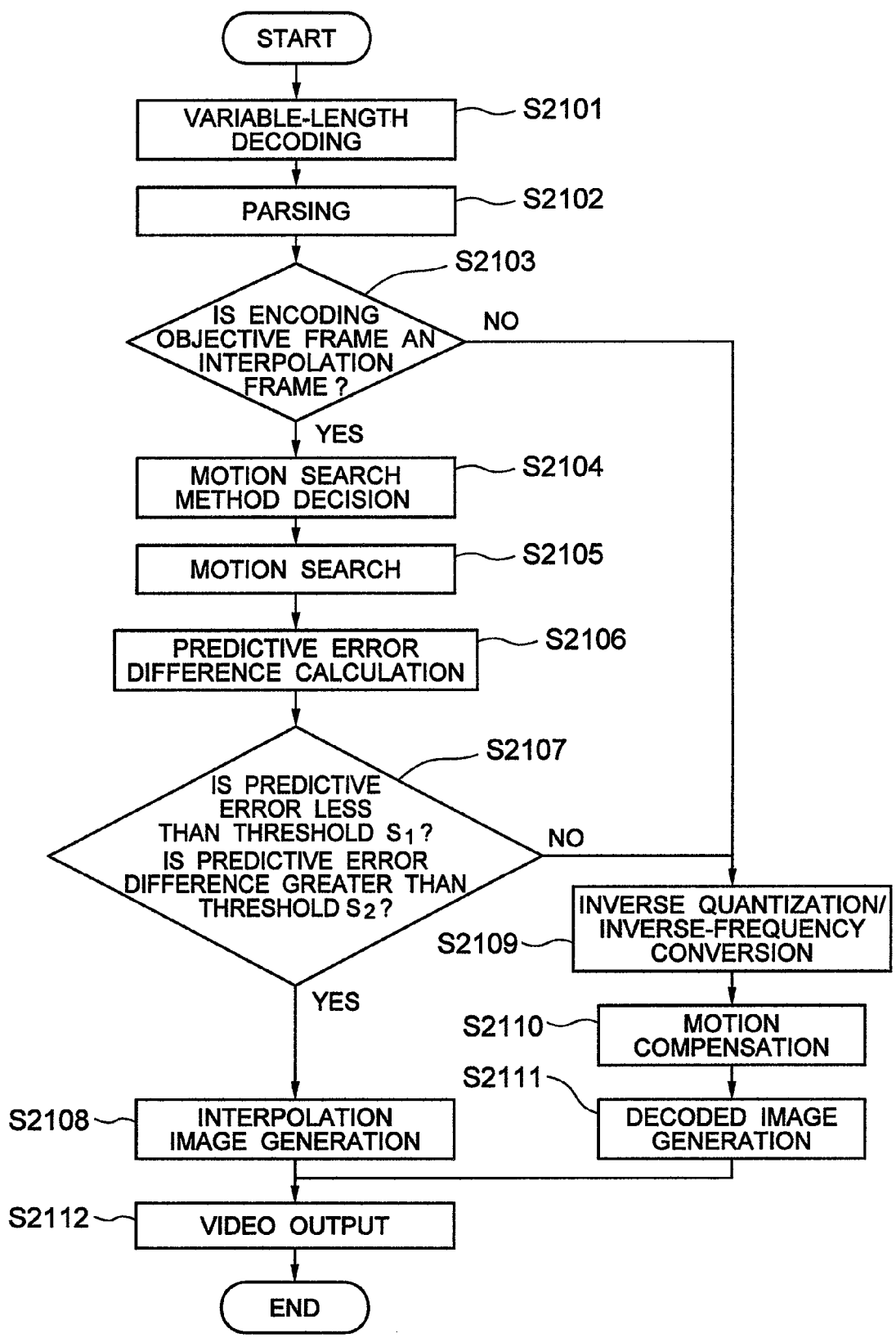
FIG. 21 is a flowchart of operation in the video decoding apparatus in embodiment 3.

Next, flow of the process in the video decoding apparatus of embodiment 3 will be described with reference to FIG. 21.

Firstly, the variable-length decoding unit 1001 decodes an encoding stream in a variable-length fashion and sends it to the parsing unit 1002 (S2101). Next, the parsing unit 1002 sorts decoded stream data in parsing and transmits encoded data to the inverse qunatizing/inverse-frequency converting unit 1003 and the interpolation image generation unit 1007 (S2102). Subsequently, the parsing unit 1002 decides the picture type of the encoded objective frame (S2103). If the encoded objective frame is an interpolation frame, the motion search method decider 2001 decides a motion search method using one of motion search directions of bi-direction, forward direction and backward direction, on the basis of a motion search direction decision flag transmitted from the parsing unit 1002 (S2104). After the motion search method has been determined, a motion search is carried out in the motion searcher 2005 (S2105). The motion searcher 2005 calculates a predictive error absolute value sum and a motion vector and besides, through a process similar to that executed by the motion searcher 1101 of embodiment 1, calculates a predictive error difference absolute value sum (S2106). Thereafter, when the predictive error absolute value sum is less than a threshold value $S_1$ or the predictive error difference absolute value sum is greater than a threshold value $S_2$, the interpolation image generator 1102 generates an interpolation pixel through a process similar to that in embodiment 1 (S2108). On the other hand, when the encoding objective frame is not an interpolation frame and the condition in S2107 is not met, the inverse quantizing/inverse-frequency converting unit 1003 carries out inverse quantization/inverse-frequency conversion, the result is added with data from the motion compensation unit 1006 and the resulting sum data is stored in the decoded image memory unit 1005. Subsequently, by using the data stored in the decoded image memory unit 1005, the motion compensation unit 1006 carries out motion compensation (S2109). By using the decoded image stored in the decoded image memory unit 1005 and the motion vector transmitted from the parsing unit 1002, the motion compensation unit 1006 makes a motion compensation, generates a decoded image and stores it in the decoded image memory unit 1005 (S2111). The decoded image or the interpolation image generated through the above method is outputted to the video display unit 1008 (S2111), thus ending the process.

As described above, according to the video decoding apparatus and method in embodiment 3, a plurality of kinds of interpolation processes can be employed adaptively by performing the process using the motion search direction decision flag included in the encoding stream. Further, it is sufficient to execute the motion search process on the decoding side only once in respect of the plural kinds interpolation processes and therefore the processing amount can be decreased to a great extent.

According to the video encoding apparatus and method and video decoding apparatus and method of embodiment 3 described so far, encoding data improved in data compression rate can be generated and the encoding data can be decoded suitably.

Embodiment 4

Next, a video encoding apparatus according to embodiment 4 of the invention will be described. The video encoding apparatus of embodiment 4 adds to the video encoding apparatus of embodiment 1 the mode selection unit 1304 of embodiment 2 and the motion searcher 302 and interpolation direction decision unit 1805 of embodiment 3. Namely, the video encoding apparatus of embodiment 4 outputs an encoding stream including a mode decision flag and a motion search direction flag.

Individual constituents and contents of individual processes are similar to those described in connection with embodiments 1, 2 and 3 and will not be described herein.

Figure 22A:
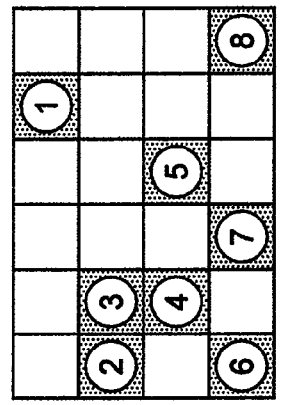
FIGS. 22A and 22B are diagrams showing an example of data to be stored in the decoded data memory unit in embodiment 4.
Figure 22B:
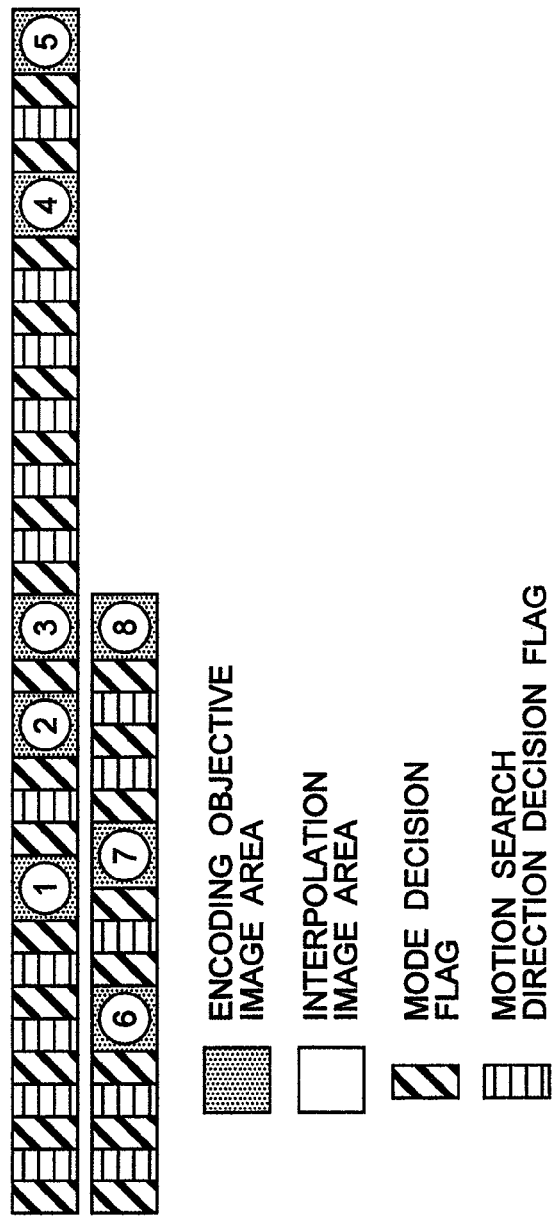

An example of data to be stored in the encoded data memory unit 106 in embodiment 4 is illustrated in FIGS. 22A and 22B. As shown in FIGS. 22A and 22B, in each divisional area, a mode decision flag for deciding whether the area is an encoding image area or an interpolation image area is added and further, in the interpolation image area, a motion search direction decision flag is added which makes a decision as to whether the bi-directional, forward or backward motion search method is to be executed.

In this manner, the video encoding apparatus and method can be realized which can attain simplifying the process and reducing the processing amount during decoding, that is, the effects of embodiment 2 and making the B picture as well as the P picture an interpolation objective frame to more reduce the data amount and improving the picture quality of the B picture, that is, the effects of embodiment 3.

Next, a video decoding apparatus of embodiment 4 will be described. The construction of the video decoding apparatus of embodiment 4 is similar to that of embodiment 3 and will not be described herein.

Figure 23:
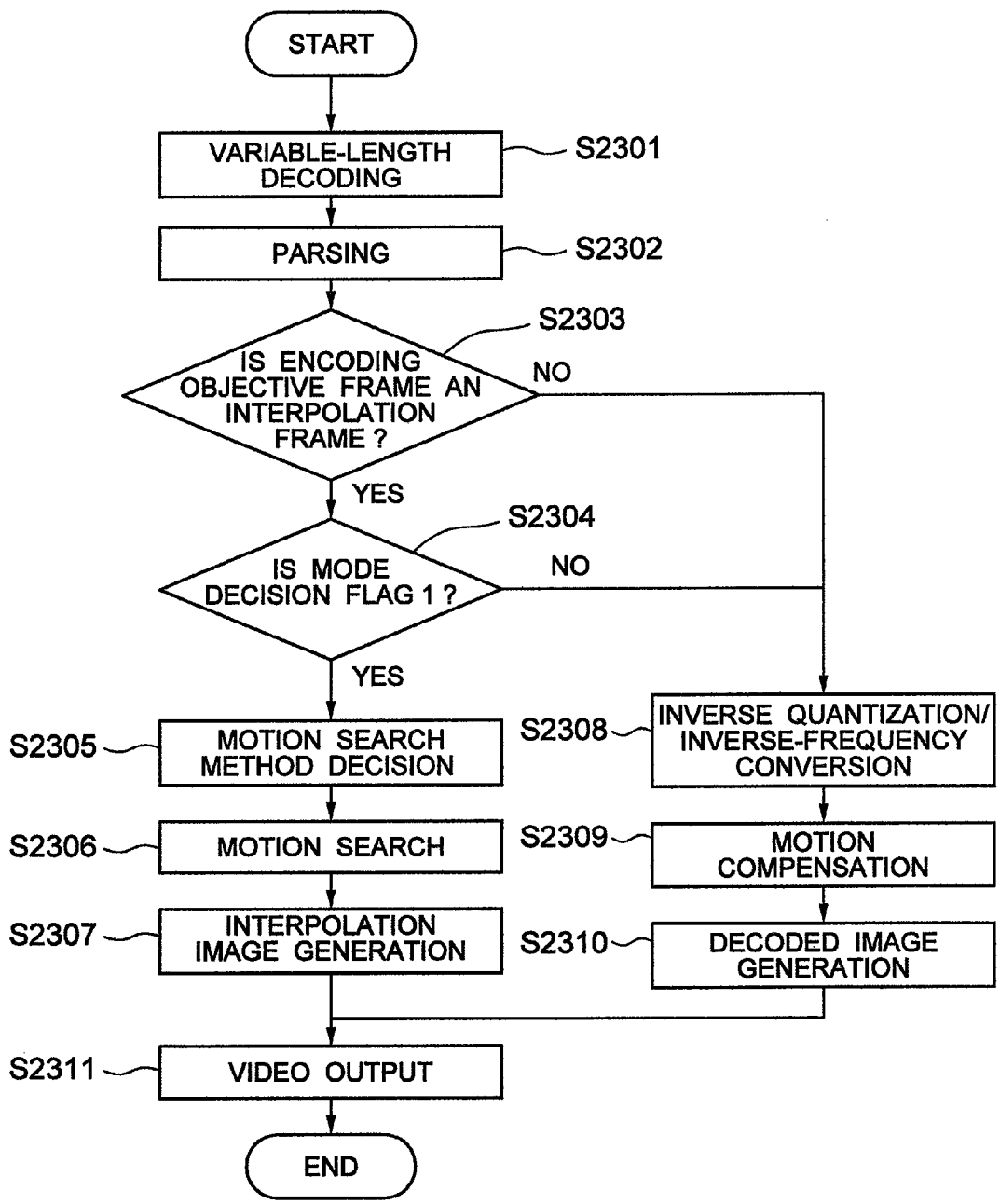
FIG. 23 is a flowchart showing operation in the video decoding apparatus in embodiment 4.

Turning now to FIG. 23, flow of process in the decoding objective area image in the decoding apparatus in embodiment 4 will be described. Firstly, the encoding stream is decoded by means of the variable-length decoding unit 1001 and is then sent to the parsing unit 1002 (S2301). Subsequently, in the parsing unit 1002, the decoded stream data is sorted in parsing and a mode decision flag, a motion search direction decision flag and encoded data are transmitted to the inverse quantizing/inverse-frequency converting unit 1003 and interpolation image generation unit 1007 (S2302). Thereafter, in the paring unit 1002, the encoding objective frame is decided, on the basis of the picture type of the encoding objective frame, as to whether to be an encoding frame or an interpolation frame (S2303). If the encoding objective frame is an interpolation frame, it is decided in respect of a decoding objective area whether the mode decision flag transmitted from the parsing unit 1002 is (indicative of the decoding objective area being an interpolation image) or not (S2304). With the mode decision flag being 1, the motion search method decider 2001 decides a motion search direction for the interpolation process on the basis of the motion search direction decision flag transmitted from the parsing unit 1002 (S2305), the motion searcher 2002, predictive error calculator 2003 and motion vector decider 2004 determine motion search, predictive error calculation and motion vector, respectively, (S2306) and the interpolation pixel generator 1102 generates an interpolation pixel by using the determined motion vector, thus generating an interpolation image (S2307).

On the other hand, when the encoding objective frame is not an interpolation frame and the condition in S2107 is not met, the inverse quantizing/inverse-frequency converting unit 1003 carries out inverse quantization/inverse-frequency conversion, adds data from the motion compensation unit 1006 and stores the resulting data in the decoded image memory unit 1005. Subsequently, by using the data stored in the decoded image memory unit 1005, the motion compensation unit 1006 carries out motion compensation (S2309). By using the decoded image stored in the decoded image memory unit 1005 and the motion vector transmitted from the parsing unit 1002, the motion compensation unit 1006 carries out motion compensation, generates a decoded image and stores it in the decoded image memory unit 1005 (S2310). The decoded image or the interpolation image generated through the above method is outputted to the video display unit 1008 (S2311), thus ending the process.

As described above, according to the video decoding apparatus and method in embodiment 4, a video decoding apparatus and method can be realized which can attain simplifying the process during decoding and reducing the processing amount, that is, the effects of embodiment 2 and can deal with a plurality of kinds of interpolation processes by performing the process using the motion search direction decision flag included in the encoding stream, so that it is sufficient to execute the motion search process only once on the decoding side in respect of the plural kinds interpolation processes and therefore the processing amount can be decreased to a great extent as represented by the effects of embodiment 3.

According to the video encoding apparatus and method and video decoding apparatus and method of embodiment 4 described so far, encoded data improved in data compression rate can be generated and the encoded data can be decoded suitably.

Embodiment 5

Next, a video encoding apparatus according to embodiment 5 of the invention will be described. The video encoding apparatus according to embodiment 5 is constructed similarly to the video encoding apparatus of embodiment 2 but while in embodiment 2 the mode selection unit 1304 generates a mode decision flag in respect of each image block, a mode selection unit 1304 in embodiment 5 generates, when a plurality of blocks in which the decoding objective area is of an interpolation image (interpolation image mode block) are in succession, a flag indicative of the number of succession of the interpolation image mode blocks (interpolation image mode succession block number flag) and outputs an encoding stream including a single interpolation image mode succession block number flag in respect of the plural successive interpolation image mode blocks. Individual constituents and contents of individual processes in the video encoding apparatus according to embodiment 5 are similar to those described in connection with embodiments 1 and 2 and will not be described herein.

In respect of a block in which the decoding objective area corresponds to an encoding objective image, an interpolation image mode exceptive mode flag indicating that the block is of a mode other than the interpolation image mode is generated and outputted. The interpolation image mode exceptive mode flag may simply indicate a mode other than the interpolation image mode but alternatively, may indicate the kind per se of encoding mode (macro-block type and the like).

Figure 24A:
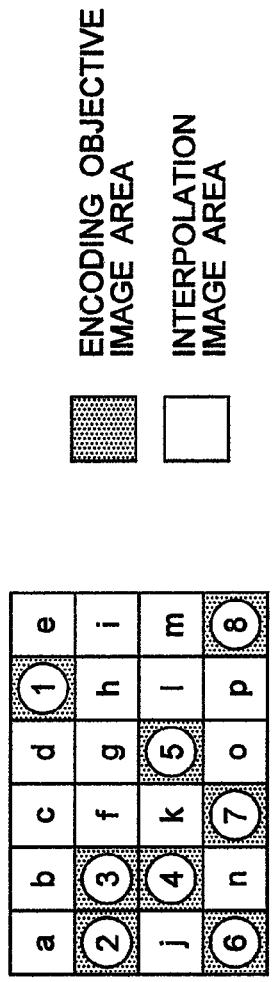
FIGS. 24A and 24B are diagrams showing an example of data to be stored in the encoded data memory unit in embodiment 5.
Figure 24B:
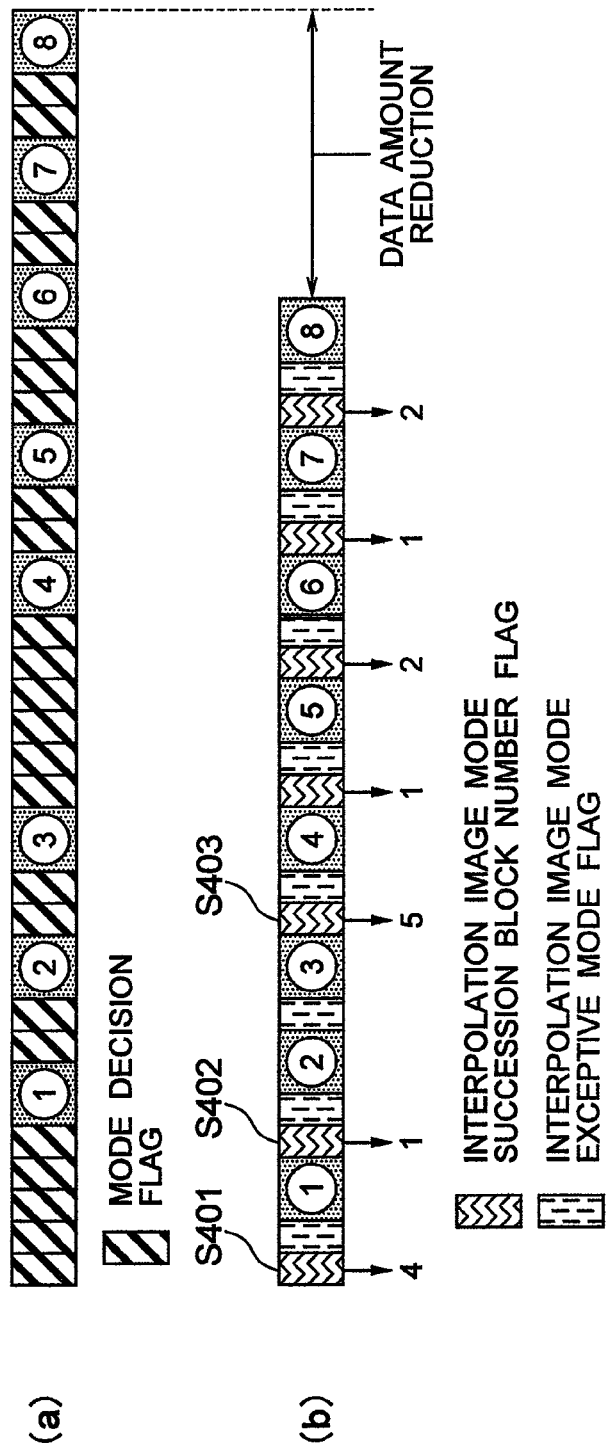

Now, an example of data in the encoded data memory unit 106 in the video encoding apparatus of embodiment 5 is illustrated in FIGS. 24A and 24B. Illustrated at (a) in FIG. 24B is data generated by the video encoding apparatus in embodiment 2 and illustrated at (b) in FIG. 24B is data generated by the video encoding apparatus in embodiment 5.

In the data in embodiment 2 at (a) in FIG. 24B, there are many successive mode decision flags. Contrary thereto, in the data in embodiment 5 at (b) in FIG. 24B, only one interpolation image mode succession block number flag is inserted at a portion where the interpolation image mode blocks are in succession. At (b) in FIG. 24B, a numerical number designated by arrow in correspondence with the interpolation image mode succession block number flag shows an example of the number of successive interpolation image mode blocks indicated by the interpolation image mode succession block number flag. More specifically, in the example at (b) in FIG. 24B, an interpolation image mode succession block number flag 2401 indicates a numerical number "4" which demonstrates that four blocks a, b, c and d are in succession to constitute an interpolation image mode block. Similarly, an interpolation image mode succession block number flag 2402 indicates a numerical number "1" which demonstrates that a block "e" alone constitutes an interpolation image mode block. Again similarly, an interpolation image mode succession block number flag 2403 indicating "5" demonstrates that five blocks f, g, h, i and j in succession constitute an interpolation image mode block. By using the interpolation image mode succession block number flag in this manner, data in embodiment 5 shown at (b) in FIG. 24B can be reduced in data amount as compared to the data in embodiment 2 shown at (a) in FIG. 24B in which the mode decision flag is added every block. For each of the blocks in which the decoding objective area corresponds to an encoding objective image, the interpolation image mode exceptive mode flag is inserted.

As described above, according to the video encoding apparatus and method in embodiment 5, in addition to simplifying the process during decoding and reducing the processing amount, that is, the effects of embodiment 2, the mode of plural blocks can be indicated by a single flag by using the interpolation image mode succession block number flag and the encoded data amount can be reduced.

Next, a video decoding apparatus according to embodiment 5 of the invention will be described. The construction of video decoding apparatus according to embodiment 5 is similar to that of the video decoding apparatus of embodiment 2 and will not be described herein. But, flow of the process in the video decoding apparatus according to embodiment 5 of the invention differs from that of the process as shown in FIG. 15 in the video decoding apparatus of embodiment 2 in the following points. The other points are similar to those in the flow shown in FIG. 15 and will not be described with reference to the drawing. More particularly, when in embodiment 2 the mode decision flag is "1" in S1504 in FIG. 15, the interpolation image generation process following S1505 is carried out but with the mode decision flag being "0", the video decoding process following S1507 is carried out.

Figure 15:
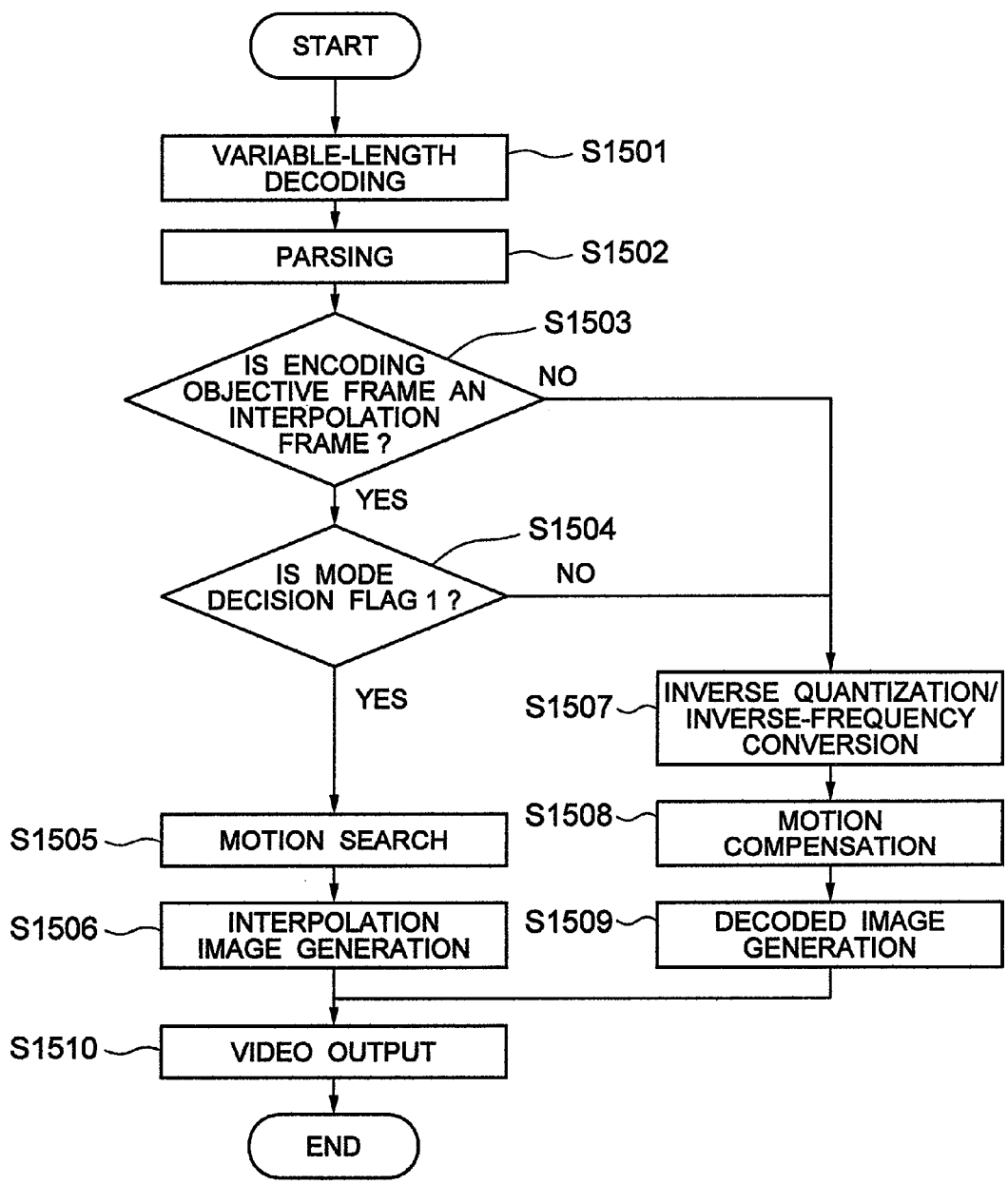
FIG. 15 is a flowchart showing operation in a video decoding apparatus in embodiment 2.

Contrarily, in embodiment 5, a flag is detected in S1504 in FIG. 15 so as to be decided as to whether to be an interpolation image mode succession block number flag or an interpolation image mode exceptive mode flag. If the detected flag is the interpolation image mode succession block number flag, the interpolation image generation process following S1505 is carried out in respect of consecutive blocks of the number indicated by the interpolation image mode succession block number flag. If the flag is the interpolation image exceptive mode flag, the video decoding process following S1507 is carried out in respect of a block to which the flag corresponds. Thus, when the flag is the interpolation image mode succession block number flag and it indicates a numerical value of 2 or more, the image generation process can be determined for the plural blocks through one decision process.

In this manner, in the video decoding apparatus according to embodiment 5, the process during decoding can be more simplified than in embodiment 2, reducing the processing amount.

According to the video decoding apparatus and method in embodiment 5 described above, the image generation process can be determined in respect of a plurality blocks through the single decision process by making correspondence with the interpolation image mode succession block number flag included in the encoding stream. Advantageously, this can ensure that simplification of the process during decoding and reduction in the processing amount can be attained more extensively than those in embodiment 2.

Embodiment 6

Next, a video encoding apparatus according to embodiment 6 of the invention will be described. The construction of video encoding apparatus according to embodiment 6 is similarly to that of the video encoding apparatus of embodiment 4 but while in embodiment 4 the mode selection unit 1304 generates a mode decision flag and a motion search direction decision flag in respect of each image block, a mode selection unit 1304 in embodiment 6 generates, like embodiment 5, an interpolation image mode succession block number flag or an interpolation image mode exceptive mode flag and generates, in respect of an interpolation image mode succession block number flag, a motion search direction decision flag. A detailed description of the motion search direction decision flag is the same as that in embodiments 3 and 4 and will not be given herein. Also, a detailed description of the interpolation image mode succession block number flag or an interpolation image mode exceptive mode flag is the same as that in embodiment 5 and will not given herein. Individual constituents and contents of individual processes in the video encoding apparatus according to embodiment 6 are similar to those described in connection with embodiments 1 to 5 and will not be described herein.

Figure 25A:
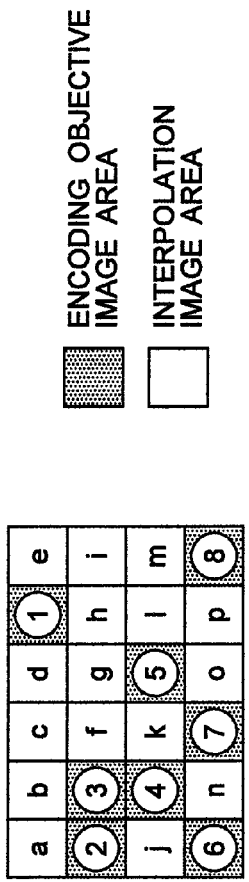
FIGS. 25A and 25B are diagrams showing an example of data to be stored in the encoded data memory unit in embodiment 6.
Figure 25B:
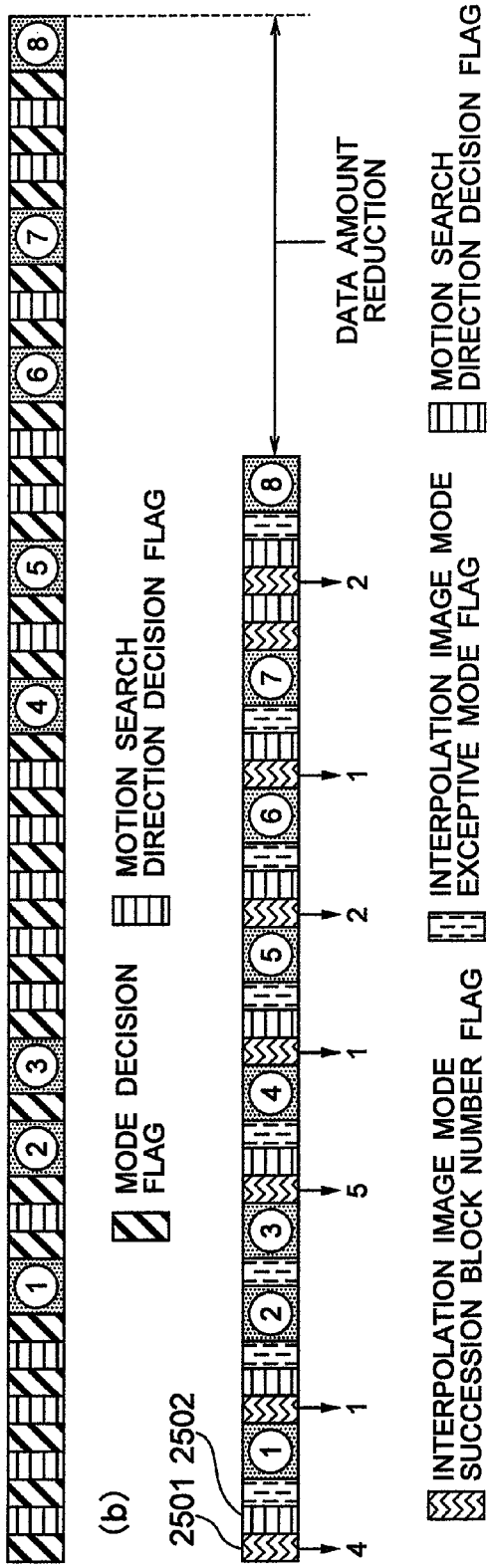

An example of data to be stored in the encoded data memory unit 106 of the video encoding apparatus in embodiment 6 is illustrated in FIGS. 25A and 25B. Illustrated at (a) in FIG. 25B is data generated by the video encoding apparatus in embodiment 4 and at (b) in FIG. 25B is data generated by the video encoding apparatus in embodiment 6. Similarly to the illustration at (b) in FIG. 24B, a numerical number indicated at arrow shown at (b) FIG. 25B in correspondence with the interpolation image mode succession block number flag depicts an example of the number of successive interpolation image mode blocks indicated by the interpolation image mode succession block number flag. More specifically, in the example at (b) in FIG. 25B, an interpolation image mode succession block number flag 2401 indicates a numerical number "4" which demonstrates that four blocks a, b, c and d are in succession to constitute an interpolation image mode block. This resembles embodiment 5. In embodiment 6, the motion search direction decision flag is generated every interpolation image mode succession block number flag and therefore, following the interpolation image mode succession block number 2501, a motion search direction decision flag 2502 is inserted. Here, for four blocks a, b, c and d which are indicated as a consecutive interpolation image mode block by the interpolation image mode succession block number flag 2501, an interpolation image is generated through a motion search method determined by a motion search direction indicated by a motion search direction decision flag 2502 accompanying the interpolation image mode succession block number flag 2501.

In the case of data in embodiment 5 shown at (b) in FIG. 25B, by using the interpolation image mode succession block number flag in this manner, the motion search direction decision flag is inserted in the encoding data in respect of each interpolation image mode succession block number. In this case, the data amount can be more reduced than in the data in embodiment 4 shown at (a) in FIG. 25B in which the mode decision flag and the motion search direction decision flag are added every block. Embodiment 6 is similar to embodiment 5 in that the interpolation image mode exceptive mode flag is inserted for respective ones of blocks in which the decoding objective area corresponds to an encoded image.

According to the video encoding apparatus and method in embodiment 6 as described above, in addition to simplifying the process and reducing the processing amount during decoding and beside, more reducing the data amount by making the P picture, in addition to the B picture, an interpolation objective frame and improving the picture quality of the B picture, that is, the effects of embodiment 4, the mode and motion search direction of plural blocks can each be indicated by a single flag by using the interpolation image mode succession block number flag and the encoding data amount can be reduced.

Next, a video decoding apparatus according to embodiment 6 of the invention will be described. The construction of video decoding apparatus according to embodiment 6 of the invention is similarly to that of the video decoding apparatus of embodiment 4 and will not be described herein. But, flow of the process in the video decoding apparatus according to embodiment 6 of the invention differs from that of the process in the video decoding apparatus of embodiment 4 shown in FIG. 23 in the following points. The other points are similar to those in the flow shown in FIG. 23 and will not be described with reference to the drawing. More particularly, when in embodiment 4 the mode decision flag is "1" in S2304 in FIG. 23, the interpolation image generation process following S2305 is carried out and at that time, in S2305, a motion search method is determined for each block on the basis of a motion search direction decision flag and a motion search in S2306 is carried out. But with the mode decision flag being "0" in S2304, the video decoding process following S2308 is carried out.

Contrarily, in embodiment 6, a flag is detected in S2304 in FIG. 23 so as to be decided as to whether to be an interpolation image mode succession block number flag or an interpolation image mode exceptive mode flag. If the detected flag is the interpolation image mode succession block number flag, the interpolation image generation process following S2305 is carried out in respect of consecutive blocks of the number indicated by the interpolation image mode succession block number flag. At that time, in S2305, on the basis of a motion search direction decision flag accompanying the interpolation image mode succession block number flag, the motion search method in interpolation image generation for the plural consecutive blocks is determined. In S2306, the motion search is conducted through the motion search method determined for the plural consecutive blocks. In S2307, an interpolation image is generated on the basis of the search result. If, in S2304, the flag is the interpolation image mode exceptive mode flag, the video decoding process following S1507 is carried out in respect of a block to which the flag corresponds.

In the above flow, while dealing with the plural kinds of interpolation processes through the process using the motion search direction decision flag, the image generation process can be determined for the plural blocks through the single decision process when the flag is the interpolation image mode succession block number flag and indicates a numerical number of 2 or more.

In the video decoding apparatus according to embodiment 6 can more simplify the process and reduce the processing amount during decoding than in embodiment 4, in addition to dealing with plural kinds of interpolation processes, that is, the effect of embodiment 4.

According to the video decoding apparatus and method in embodiment 6 described as above, plural image generation processes can be determined in respect of plural blocks through a single decision process by dealing with plural kinds of interpolation processes and dealing with the interpolation image mode succession block number flag included in the encoding stream. Advantageously, this can ensure that simplification of the process and reduction in the processing amount during decoding can be attained more extensively than those in embodiment 4.

It will be appreciated that an embodiment can be worked out by modifying the interpolation image generation methods in the foregoing individual embodiments into first to third modifications as below.

Figure 26:
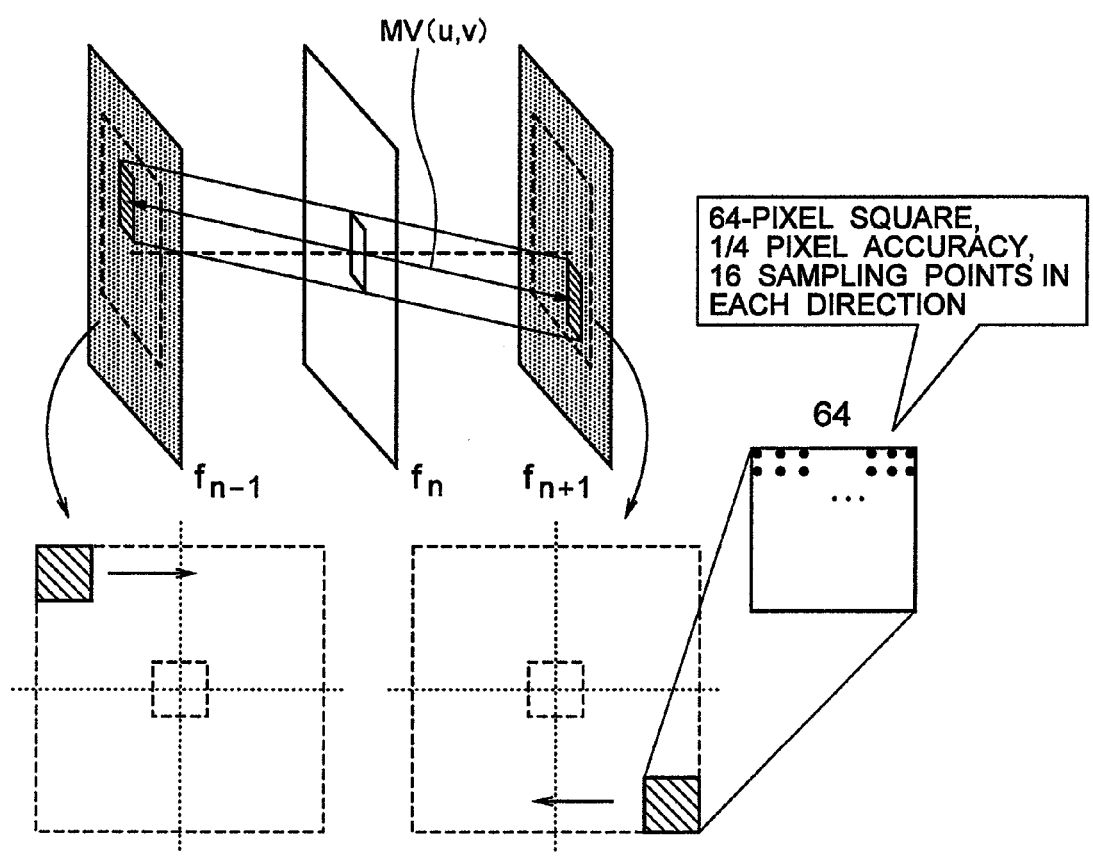
FIG. 26 is a diagram showing a first modification of interpolation image generation method.

The first modification will be described by making reference to FIG. 26. Illustrated in FIG. 26 is an interpolation image generation method in the first modification. In the first modification, the encoding/decoding objective frame is a single B picture existing between reference frames. In FIG. 26, $f_n$ represents an encoding/decoding objective frame, $f_{n-1}$ a reference frame finished with encoding/decoding which precedes in order of display and is positioned most closely to the encoding/decoding objective frame, and $f_{n+1}$ a reference frame finished with encoding/decoding which succeeds in order of display and is positioned most closely to the encoding/decoding objective frame.

In the first modification, searching a motion vector MV(u, v) and calculating an interpolation pixel value $f_n(x,y)$ are materialized through the following methods.

Motion search in the first modification is carried out in a unit of block. For example, the motion search is started from the left-above end in the frame $f_{n-1}$ and from the right-below end in the frame $f_{n+1}$ so as to make a search in a right/left and above/below symmetrical fashion. A total of absolute error sums (SAD) of two blocks is calculated and a combination of blocks for which the SAD is minimal and the MV is also minimal. Here, the motion search is carried out on, for example, a plane of ¼ pixel accuracy. On the ¼ pixel accuracy plane, the block size for motion search is set to 64×64 pixels and by skipping 4 pixels, 16 pixels are used as sampling points. The motion search range is referenced to the center of the encoding objective block.

For calculation of an interpolation pixel value $f_n(x,y)$ inside the encoding/decoding objective frame in the first modification, a motion vector MV(u,v) between the frame $f_{n-1}$ and the frame $f_{n+1}$ is used and calculation is executed pursuant to equation (6).

$$f_n(x, y) = \left\{ f_{n-1}\left(x - \frac{1}{2}u, y - \frac{1}{2}v\right) + f_{n+1}\left(x + \frac{1}{2}u, y + \frac{1}{2}v\right) \right\} / 2 \quad (6)$$

In equation (6), the $f_n(x,y)$ is calculated in terms of an average value of pixels on the reference frames $f_{n-1}$ and $f_{n+1}$ representing the start and end points of MV(u,v), respectively. The reason for this is that in the first modification the encoding/decoding objective frame is a single B picture positioned centrally of the plural reference frames and is temporally equidistant from the two reference frames. If there is a bias between the temporal distances from the both reference frames, the coefficient ½ by which u and v are multiplied in equation (6) may be changed in accordance with the bias. In this case, the smaller the temporal distance to the reference frame, the more the coefficient becomes small. In such an instance, the pixel values on individual reference frames $f_{n-1}$ and $f_{n+1}$ may be multiplied by coefficients complying with respective temporal distance biases. Then, the closer the temporal distance to the reference frame, the larger the coefficient becomes.

The motion vector MV(u,v) and the interpolation pixel value $f_n(x,y)$ in the first modification can be obtained through the search method and calculation method described as above, respectively.

Figure 27A:
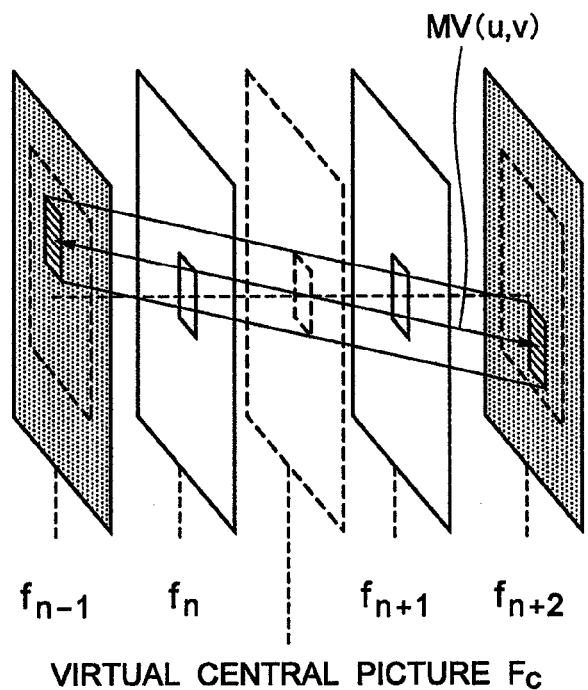
FIGS. 27A, 27B and 27C are diagrams showing an example of a second modification of the interpolation image generation method.
Figure 27B:
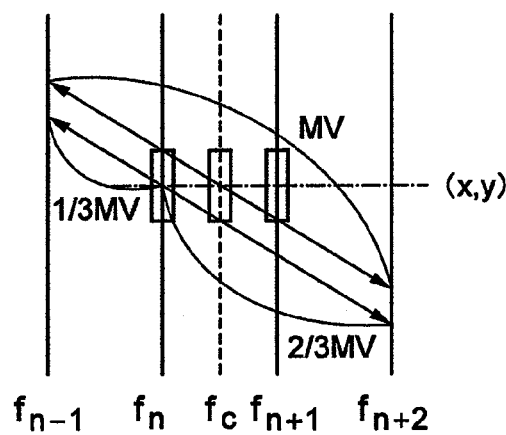
Figure 27C:
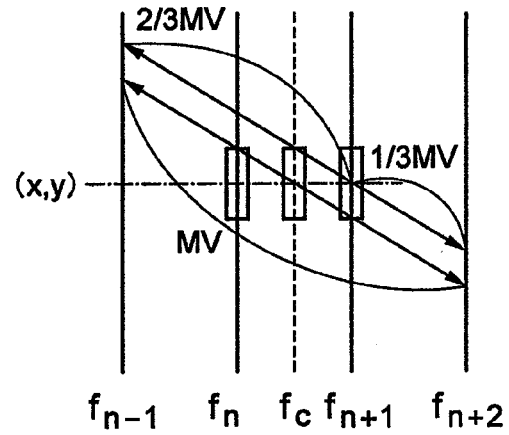

Next, a second modification will be described with reference to FIGS. 27A, 27B and 27C. In the second modification, the encoding/decoding objective frame is either of two B pictures existing between reference frames. In this case, the motion search is carried out only once for the two existing B pictures. In FIG. 27A, $f_n$ represents a first encoding/decoding objective frame, $f_{n+1}$ represents a second encoding/decoding objective frame, $f_{n-1}$ represents a reference frame finished with encoding/decoding which precedes the encoding/decoding objective frame in order of display and is positioned most closely thereto, $f_{n+2}$ represents a reference frame finished with encoding/decoding which succeeds the encoding/decoding objective frame and is positioned most closely thereto, and $f_c$ represents a virtual central picture.

In the second modification, searching a motion vector MV(u,v) and calculating an interpolation pixel value $f_n(x,y)$ of the first encoding/decoding objective frame and an interpolation pixel value $f_{n+1}(x,y)$ of the second encoding/decoding objective frame are materialized through the following methods.

Firstly, for the motion search in the second modification, the center of the motion search range is so defined as to be centered on an encoding/decoding objective block position (x,y) of the virtual central picture $f_c$. The remaining details of calculation of the motion vector MV(u,v) are similar to those in the first modification and will not be described herein.

An interpolation pixel value $f_n(x,y)$ of the first encoding/decoding objective frame and an interpolation pixel value $f_{n+1}(x,y)$ of the second encoding/decoding objective frame can be calculated by using the motion vector MV(u,v) between the frames $f_{n-1}$ and $f_{n+2}$ from equations (7) and (8), respectively.

$$f_n(x, y) = \left\{ 2f_{n-1}\left(x - \frac{1}{3}u, y - \frac{1}{3}v\right) + f_{n+2}\left(x + \frac{2}{3}u, y + \frac{2}{3}v\right) \right\} / 3 \quad (7)$$

$$f_{n+1}(x, y) = \left\{ f_{n-1}\left(x - \frac{2}{3}u, y - \frac{2}{3}v\right) + 2f_{n+2}\left(x + \frac{1}{3}u, y + \frac{1}{3}v\right) \right\} / 3 \quad (8)$$

The calculation method pursuant to equation (7) will be described with reference to FIG. 27B. In an example of FIG. 27B, the illustration in FIG. 27A is shown in plane form. In the example, calculation of a pixel value at position (x, y) of the first encoding/decoding frame $f_n$ is carried out through motion search referenced to the position (x,y) of the virtual center picture. In the example in FIG. 27B, the first encoding/decoding objective frame $f_n$ is distant from the reference frame $f_{n-1}$ by ⅓ of temporal distance between the reference frame $f_{n-1}$ and the reference frame $f_{n+2}$ and is distant from the reference frame $f_{n+2}$ by ⅔ thereof. Accordingly, in equation (7), the pixel value of the first encoding/decoding objective frame $f_n$ (x,y) is calculated by referencing to the position (x,y) of the first encoding/decoding objective frame $f_n$ and by multiplying, by weight coefficients complying with the temporal distances to the individual reference frames, respectively, a pixel value of pixel on reference frame $f_{n-1}$, indicated by using ⅓ MV resulting from multiplication of the motion vector MV by ⅓, and a pixel value of pixel on the reference frame $f_{n+2}$, indicated by using ⅔ W resulting from multiplication of the motion vector MV by ⅔ and by summing the resultant product values. Here, as the temporal distance to the reference frame becomes shorter, the weight coefficient may become larger proportionately and in the example of FIG. 27B, the pixel value of pixel on the reference frame $f_{n-1}$ is multiplied by ⅔ and the pixel value of pixel on the reference frame $f_{n-1}$ is multiplied by ⅓.

The calculation method pursuant to equation (8) will be described with reference to FIG. 27C. The calculation method pursuant to equation (8) is similar to that pursuant to equation (7) in that the motion vector MV(u,v) is used, the position (x,y) of the second encoding/decoding objective frame $f_{n+1}$ is referenced to, that a pixel on the reference frame is selected by using a motion vector resulting from multiplication of the motion vector MV(u,v) by a coefficient in accordance with the temporal distance from the encoding/decoding objective frame to the reference frame and that the selected pixel values are multiplied by weight coefficients complying with the temporal distances to the reference frame and added together. FIG. 27C differs from FIG. 27B only in that the relation of temporal distance from the encoding/decoding objective frame to the respective reference frames differs and the coefficient by which the motion vector MV(u,v) is multiplied is different and so a detailed description will be omitted.

When, even in the case of two B pictures existing between the reference frames as in the case of the second modification, the temporal position of the individual B pictures is not positioned at ⅓ equidistance to the respective reference frames, the coefficient may be changed in accordance with the temporal distance to the reference frame.

Employed in the second modification are the aforementioned method for searching the motion vector MV(u,v) and method for calculating the interpolation pixel value $f_n(x,y)$ of the first encoding/decoding objective frame and the interpolation pixel value $f_{n+1}(x,y)$ of the second encoding/decoding objective frame.

Namely, according to the second modification, interpolation pixel values can be calculated through one motion search in respect of the individual pixels at the same position on the two encoding/decoding objective frames, respectively, which are positioned between the reference frames.

Figure 28:
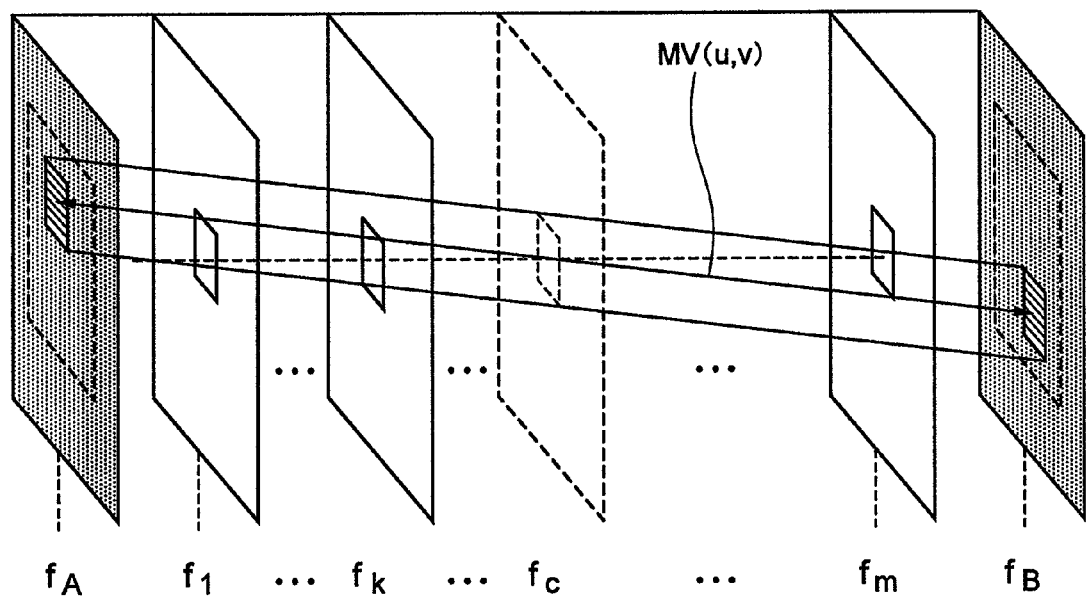
FIG. 28 is a diagram showing an example of a third modification of the interpolation image generation method.

Next, a third modification will, be described with reference to FIG. 28. In the third modification, the first and second modifications are generalized, indicating an instance where m sheets of B pictures exist between two reference frames. In FIG. 28, m B pictures from $f_1$(first B picture) to $f_m$(m-th B picture) are inserted between reference frames $f_A$ and $f_B$. Here, $f_c$ represents a virtual central picture which provides the reference as in the case of the second modification when calculating a motion vector MV(u,v).

In the third modification, when a k-th B picture $f_k$ shown in FIG. 28 is an encoding/decoding objective frame, an interpolation pixel value $f_k(x,y)$ can be calculated from equation (9).

$$f_k(x, y) = \left\{ (m + 1 - k) \times f_A\left(x - \frac{k}{m+1}u, y - \frac{k}{m+1}v\right) + k \times f_B\left(x + \frac{m+1-k}{m+1}u, y + \frac{m+1-k}{m+1}v\right) \right\} / (m + 1) \quad (9)$$

The calculation method pursuant to equation (9) is also similar to that pursuant to equation (7) or (8) in that the motion vector MV(u,v) is used, that the position (x,y) of the encoding/decoding objective frame $f_k$ is referenced to, that a pixel on the reference frame is selected by using a motion vector resulting from multiplication of the motion vector MV(u,v) by a coefficient in accordance with the temporal distance from the encoding/decoding objective frame to the reference frame and that the selected pixel value is multiplied by weight coefficients complying with the temporal distances to the reference frames and added together.

The method for calculating the interpolation pixel value $f_k$ (x,y) of the encoding/decoding objective frames as above is employed in the third modification.

Namely, according to the third modification, an interpolation pixel value can be calculated through one motion search in respect of individual pixels at the same position on m encoding/decoding objective frames positioned between the reference frames.

In any of the interpolation image frame, interpolation image area, interpolation image mode and interpolation image mode block described in connection with the foregoing embodiments, an interpolation image is generated through the interpolation process based on the motion prediction between the reference images and therefore, they may be expressed as an inter-reference image predictive frame, an inter-reference image motion predictive area, an inter-reference image motion predictive mode and an inter-reference image motion predictive mode block, respectively.

The video encoding/decoding technique using the interpolation image, namely, image encoding/decoding technique based on the inter-reference image motion prediction described in connection with the foregoing embodiments is advantageous over the conventional technique as will be described below.

More particularly, in the bi-directional motion compensation prediction in the H.264/AVC, the skipping mode and direct mode for predictive generation of motion information from motion information of an encoded block is adopted. The skipping mode and direct mode does not need transmission of motion information and therefore, it is a technique effective for reducing the encoding amount. In the skipping mode and direct mode, however, the accuracy of prediction of the motion information will sometimes be degraded. For example, in the time direct mode utilizing the correlation of motion information in time direction, a motion vector of a block (anchor block) at the same position as an encoding objective block inside a reference image immediately succeeding an encoding objective image in order of display and in the case of an image in which the anchor block is encoded inside the screen, no motion information can be acquired, thus degrading the prediction accuracy. Also, in the space direct mode utilizing the correlation of motion information in spatial direction, a motion vector of a block peripheral of an encoding objective block and in the case of images in which individual peripheral blocks move differently, the spatial correlation of the motion information decreases, thus degrading the prediction accuracy.

Contrary thereto, in the image encoding/decoding technique using the interpolation image described in connection with the foregoing individual embodiments, namely, image encoding/decoding technique based on the inter-reference image motion prediction, a block having a high correlation with a forward reference image and a backward reference image is detected and its detected motion vector is used. Accordingly, even in an image liable to be degraded in predictive accuracy in the skip mode and direct mode, that is, in an image in which the encoding objective block is a mobile image and the anchor block is of an image encoded inside the screen, degradation in prediction accuracy can be suppressed.

Also, likewise, in the video encoding/decoding technique using an interpolation image described in connection with the foregoing embodiments, a motion vector is predicted without using a motion vector of a block peripheral of an encoding objective block. Therefore, even in an image liable to be degraded in prediction accuracy in the skip mode and direct mode, that is, an image the peripheral blocks of which move differently, degradation in prediction accuracy can be suppressed.

In other words, in the video encoding/decoding technique according to the individual embodiments of the present invention, improvements in data compression rate can be realized more preferentially than in the conventional skip mode and direct mode.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video decoding method of decoding an encoded video stream comprising the steps of:

receiving a motion search direction decision flag in the encoded video stream;

searching, with respect to a decoding objective area of a decoding objective frame, for a motion vector according to a motion search direction specified by the motion search direction decision flag using a plurality of decoded images of a plurality of decoded frames where the decoding objective frame is an interpolation frame positioned where two of the plurality of decoded frames are linearly connected with the decoding objective area, and an objective pixel included in said decoding objective area is positioned between and on a same straight line in a frame of space and time as each of plural pixels positioned on said decoded images of plural decoded frames; and deciding, on the basis of a result of said motion vector search, whether an image of said decoding objective area is to be generated through an interpolation process in accordance with the motion search direction or a decoded image is to be generated through motion compensation using data included in the encoded video stream.

2. The video decoding method according to claim 1 further comprising the step of:

when, in said deciding step, a decoded image is so determined as to be generated by performing motion compensation for an image of said decoding objective area through the use of data included in the encoded video stream, generating the decoded image by changing a method for calculation of a predictive vector and performing a motion compensation depending on whether individual plural image areas adjacent to said decoding objective area of said decoding objective frame are areas which have been processed as encoding objective areas during encoding or areas which have been processed as interpolation image areas during encoding.

3. The video decoding method according to claim 1 further comprising the step of:

when, in said deciding step, an image of said decoding objective area is so determined as to be generated as a decoded image through motion compensation using data included in the encoded video stream and any of individual plural image areas adjacent to a decoding objective area of said decoding objective frame are areas which have been processed as interpolation image areas during encoding, generating a decoded image by calculating a predictive vector on the basis of a motion vector used in an interpolation process during decoding of said plural adjacent image areas and by performing a motion compensation through the use of said predictive vector.

4. The video decoding method according to claim 1 further comprising the step of:

when, in said deciding step, an image of said decoding objective area is so determined as to be generated as a decoded image through motion compensation using data included in the encoded video stream, part of plural image areas adjacent to a decoding objective area of said decoding objective frame are areas which have been processed as encoding objective image areas during encoding and the rest of said plural adjacent image areas are areas which have been processed as interpolation image areas during encoding, generating a decoded image by calculating a predictive vector on the basis of a motion vector used in the motion compensation during decoding in the area which has been processed as the encoding objective image area and a motion vector used in the interpolation process during decoding in the area which has been processed as the interpolation image area during encoding and by performing a motion compensation through the use of said predictive vector.

5. The video decoding method according to claim 1 further comprising the step of:
when, in said deciding step, an image of said decoding objective area is so determined as to be generated as a decoded image through motion compensation using data included in the encoded video stream, part of plural image areas adjacent to a decoding objective area of said decoding objective frame are areas which have been processed as encoding objective image areas during encoding and the rest of said plural adjacent image areas are areas which have been processed as interpolation image areas during encoding,
generating a decoded image by calculating as a predictive vector a median vector of motion vectors used in the motion compensation during decoding in the area which has been processed as the encoding objective image area and a motion vector used in the interpolation process during decoding in the area which has been processed as the interpolation image area during encoding and performing a motion compensation through the use of said predictive vector.

6. The video decoding method according to claim 1 further comprising the step of:
when, in said deciding step, an image of said decoding objective area is so determined as to be generated through an interpolation process, generating an interpolation image of said decoding objective area by calculating a pixel value on the image of said decoding objective area through the use of pixel values on images of the plural decoded frames which have been used in said motion vector search step.

7. The video decoding method according to claim 1, wherein
in said motion vector search step, the differences in absolute values of pixel values are calculated between an objective pixel included in said decoding objective area and each of plural pixels positioned on the decoded images of the plural decoded frames, said plural pixels being positioned on the same straight line in a frame of space and time as said objective pixel, an absolute difference sum of said pixel values is calculated in respect of said pixel included in said decoding objective area and a motion vector for which the absolute difference sum is minimized and said minimum absolute value sum are obtained as the result of motion vector search, and wherein, in said deciding step, said minimum absolute value sum is compared with a predetermined value to decide whether the image of said decoding objective area is to be generated through an interpolation process or not.

8. The video decoding method according to claim 1, wherein
in said motion vector search step, the differences in pixel values are calculated between an objective pixel included in said decoding objective area and each of plural pixels positioned on plural images finished with decoding, said plural pixels being positioned on the same straight line in a frame of space and time as said objective pixel, an absolute difference sum of said pixel values is calculated in respect of the pixel included in said decoding objective area and a motion vector for which said absolute difference sum is minimized is determined, a difference between said minimum absolute value sum and an absolute value sum of pixel values of areas peripheral of said decoding objective area is calculated, and said motion vector, said minimum absolute value sum and the difference in the absolute value sum of the areas peripheral of said decoding objective area are obtained as the result of motion vector search, and wherein, in said deciding step, the absolute value sum of the difference between said minimum absolute value sum and the absolute value sum of the areas peripheral of said decoding objective area is compared with a predetermined value to decide whether an image of said decoding objective area is to be generated through the interpolation process or not.

9. The video decoding method according to claim 1, wherein
when a single B picture is positioned between of the decoded frames and said B picture is the decoding objective frame and an image of said decoding objective area is so determined, in said deciding step, as to be generated through interpolation process, an interpolation image generation step is provided in which an average value of plural pixel values on images of said plural decoded frames which have been used in said motion vector search step or a value obtained by multiplying each of the plural pixel values by a coefficient corresponding to a distance from said decoding objective frame to each of said plural decoded frames is used to calculate a pixel value on the image of said decoding objective area to thereby generate an interpolation image of said decoding objective area.

10. The video decoding method according to claim 1, wherein
when m B pictures are positioned between of the decoded frames finished with decoding and one of said m B pictures is said decoding objective frame and an image of said decoding objective area is so determined, in said deciding step, as to be generated through an interpolation process, an interpolation image generation step is provided in which a value obtained by multiplying each of the plural pixel values on said plural decoded frames which have been used in said motion vector search step by a coefficient corresponding to a distance from said decoding objective frame to each of said plural decoded frames is used to calculate a pixel value on the image of said decoding objective area to thereby generate an interpolation image of said decoding objective area.

11. The video decoding method according to claim 1, wherein
the motion vector search is conducted using a plurality of decoded images of a plurality of decoded frames where the decoding objective frame is an extrapolation frame positioned where two of the plurality of decoded frames are linearly connected with the decoding objective area, and an objective pixel included in said decoding objective area is positioned on a same straight line in a frame of space and time as each of plural pixels positioned on said decoded images of plural decoded frames and the plural decoded frames precede said decoding objective frame, and
deciding, on the basis of a result of said motion vector search, whether an image of said decoding objective area is to be generated through an extrapolation process in accordance with the motion search direction or a decoded image is to be generated through motion compensation using data included in the encoded video stream.

12. A video decoding method of decoding an encoded video stream comprising the steps of:
deciding, on the basis of a mode decision flag included in the encoded video stream, whether an image of a decoding objective area is to be generated through an interpolation process using a plurality of decoded images of a plurality of decoded frames of the encoded video stream where the decoding objective area belongs to a decoding objective frame which is an interpolation frame positioned where two of the plurality of decoded frames are linearly connected with the decoding objective area or through a motion compensation process using data included in the encoded video stream, wherein the interpolation process is performed under a condition that an objective pixel included in said decoding objective area is positioned between and on a same straight line in a frame of space and time as each of plural pixels positioned on said decoded images of plural decoded frames; and
generating a decoded image by switching over, in accordance with the result of decision in said decision step, from an interpolation process using decoded image to a motion compensation process using data included in the encoded video stream and vice versa,
wherein the image of the decoding objective area is generated through an interpolation process according to a motion search direction decision flag included in the encoded video stream which specifies an interpolation direction in which the image is generated.

13. The video decoding method according to claim 12, wherein
when, in said deciding step, a decoded image of said decoding objective area is so determined as to be generated through motion compensation using the data included in the encoded video stream, the decoded image is generated by changing, in said image generation step, a method for calculation of a predictive vector depending on whether individual plural image areas adjacent to a decoding objective area of said decoding objective frame are areas which have been processed as encoded image areas during encoding or have been processed as interpolation image areas during encoding and by performing a motion compensation.

14. The video decoding method according to claim 12, when, in said deciding step, a decoded image of said decoding objective area is so determined as to be generated through motion compensation using data included in the encoded video stream and individual plural image areas adjacent to a decoding objective area of said decoding objective frame are areas which have been processed as interpolation image areas during encoding, the decoded image is generated, in said image generation step, by calculating a predictive vector on the basis of motion vectors used in an interpolation process during decoding of said plural adjacent image areas and performing a motion compensation by using said predictive vector.

15. The video decoding method according to claim 12, wherein
when, in said deciding step, a decoded image of said decoding objective area is so determined as to be generated through motion compensation using data included in the encoded video stream, part of said plural image areas adjacent to a decoding objective area of said decoding objective frame are areas which have been processed as encoded objective image areas during encoding and the rest of said plural adjacent image areas are areas which have been processed as interpolation image areas during encoding, the decoded image is generated, in said image generating step, by calculating a predictive vector on the basis of a motion vector used in the motion compensation during decoding in the area which has been processed as the encoded objective image area and a motion vector used in the interpolation process during decoding in the area which has been processed as the interpolation image area during encoding and by performing a motion compensation through the use of said predictive vector.

16. The video decoding method according to claim 12, when, in said deciding step, an image of said decoding objective area is so determined as to be generated through an interpolation process using a decoded image, a motion search method is determined, the interpolation image is generated by determining a motion search method on the basis of a motion search method decision flag included in the encoded video stream, performing a motion search by using the images of the plural decoded frames on the basis of the determined motion search method, and calculating a pixel value of the interpolation objective pixel on the basis of pixel values of pixels on said plural decoded frames which have been indicated by the motion vector determined by the motion vector search.

17. The video decoding method according to claim 12, wherein
when a single B picture is positioned between of the decoded frames and said B picture is the decoding objective frame and an image of said decoding objective area is so determined, in said deciding step, as to be generated through an interpolation process, an interpolation image generating step is provided in which an average value of plural pixel values on images of said plural decoded frames which have been used in said motion vector search step or a value obtained by multiplying each of the plural pixel values by a coefficient corresponding to a distance from said decoding objective frame to each of said plural decoded frames is used to calculate a pixel value on the image of said decoding objective area to thereby generate an interpolation image of said decoding objective area.

18. The video decoding method according to claim 12, including:
further deciding whether an image of said decoding objective area is to be generated through an extrapolation process or through the motion compensation process using data included in the encoded video stream,
the extrapolation process being performed under a condition that an objective pixel included in said decoding objective area is positioned on a same straight line in a frame of space and time as each of plural pixels positioned on said decoded images of plural decoded frames, and the plural decoded frames precede said decoding objective frame,
further generating a decoded image by switching over, in accordance with the result of said further deciding, from an extrapolation process using decoded images to the motion compensation process using data included in the encoded video stream and vice versa,
wherein the image of the decoding objective area is generated through an extrapolation process according to a motion search direction decision flag included in the encoded video stream which specifies an extrapolation direction in which the image is generated.

19. A video decoding method of decoding an encoded video stream including a first flag indicative of the number of consecutive image blocks to be generated through an interpolation process using decoded images in a decoding objective area and a second flag indicating that a decoded image is to be generated with respect to an image block of the decoding objective area through a motion compensation process using data included in the encoded video stream, comprising the steps of:

detecting a flag from said encoded video stream to decide whether the detected flag is the first flag or the second flag; and generating a decoded image by switching over, in accordance with the decision result in said detecting step, an interpolation process using a plurality of decoded images of a plurality of decoded frames where the consecutive image blocks are interpolated at a position where two of the plurality of decoded frames are linearly connected with the consecutive image blocks and applied to plural image blocks corresponding to the first flag to a motion compensation process using data included in the encoded video stream and applied to an image block corresponding to the second flag, wherein the interpolation process is performed under a condition that an objective pixel included in said decoding objective area is positioned between and on a same straight line in a frame of space and time as each of plural pixels positioned on said decoded images of plural decoded frames, wherein in the interpolation process, the consecutive image blocks are interpolated according to a motion search direction decision flag included in the encoded video stream which specifies an interpolation direction.

20. The video decoding method according to claim 19, including:

further generating a decoded image by switching to an extrapolation process using a plurality of decoded images of a plurality of decoded frames where the consecutive image blocks are extrapolated at a position where two of the plurality of decoded frames are linearly connected with the consecutive image blocks and applied to plural image blocks corresponding to the first flag to a motion compensation process using data included in the encoded video stream and applied to an image block corresponding to the second flag, wherein the extrapolation process is performed under a condition that an objective pixel included in said decoding objective area is positioned between and on a same straight line in a frame of space and time as each of plural pixels positioned on said decoded images of plural decoded frames and the plural decoded frames precede said decoding objective frame, wherein in the extrapolation process, the consecutive image blocks are extrapolated according to a motion search direction decision flag included in the encoded video stream which specifies an extrapolation direction.

* * * * *